US008632898B2

(12) United States Patent
Dougherty et al.

(10) Patent No.: US 8,632,898 B2
(45) Date of Patent: Jan. 21, 2014

(54) BATTERY SYSTEM INCLUDING BATTERIES THAT HAVE A PLURALITY OF POSITIVE TERMINALS AND A PLURALITY OF NEGATIVE TERMINALS

(75) Inventors: Thomas J. Dougherty, Waukesha, WI (US); James S. Symanski, Greenfield, WI (US); Joerg A. Kuempers, Wedemark (DE); Uwe Koehler, Kassel (DE); Ronald C. Miles, Whitefish Bay, WI (US); Scott A. Hansen, Holland, MI (US); Nels R. Smith, Zeeland, MI (US); Majid Taghikhani, Franklin, WI (US); Edward N. Mrotek, Grafton, WI (US); Michael G. Andrew, Menomonee Falls, WI (US)

(73) Assignee: Johnson Controls Technology Company, Holland, MI (US)

( * ) Notice: Subject to any disclaimer, the term of this patent is extended or adjusted under 35 U.S.C. 154(b) by 2043 days.

(21) Appl. No.: 10/976,169

(22) Filed: Oct. 28, 2004

(65) Prior Publication Data

US 2005/0174092 A1    Aug. 11, 2005

Related U.S. Application Data

(60) Provisional application No. 60/515,346, filed on Oct. 28, 2003.

(51) Int. Cl.
*H01M 2/22* (2006.01)
*H01M 2/20* (2006.01)
*H01M 2/30* (2006.01)
*H01M 2/10* (2006.01)
*H01M 10/50* (2006.01)

(52) U.S. Cl.
USPC ............... 429/1; 429/178; 429/120; 429/156; 429/123

(58) Field of Classification Search
USPC ......... 429/120, 122, 123, 148, 156–160, 178, 429/179
See application file for complete search history.

(56) References Cited

U.S. PATENT DOCUMENTS

| 418,483 A | 12/1889 | Woolf |
| 3,377,201 A | 4/1968 | Wagner et al. |

(Continued)

FOREIGN PATENT DOCUMENTS

| CN | 2399831 Y | * 10/2000 | ............. H01M 2/20 |
| EP | 0 771 037 B1 | 5/1997 | |

(Continued)

OTHER PUBLICATIONS

Machine Translation for Yang, CN 2399831 Y.*

(Continued)

*Primary Examiner* — Edu E Enin-Okut
(74) *Attorney, Agent, or Firm* — Foley & Lardner LLP

(57) ABSTRACT

A lithium battery for use in a vehicle includes a container, a plurality of positive terminals extending from a first end of the lithium battery, and a plurality of negative terminals extending from a second end of the lithium battery. The plurality of positive terminals are provided in a first configuration and the plurality of negative terminals are provided in a second configuration, the first configuration differing from the second configuration. A battery system for use in a vehicle may include a plurality of electrically connected lithium cells or batteries.

79 Claims, 15 Drawing Sheets

(56) References Cited

U.S. PATENT DOCUMENTS

| | | | |
|---|---|---|---|
| 3,847,671 A | 11/1974 | Leparulo et al. | |
| 4,207,387 A | 6/1980 | Jutte | |
| 4,349,613 A | 9/1982 | Winsel | |
| 4,418,127 A * | 11/1983 | Shambaugh et al. | 429/8 |
| 4,528,248 A | 7/1985 | Galbraith | |
| 5,004,129 A | 4/1991 | Loch et al. | |
| 5,169,234 A * | 12/1992 | Bohm | 374/128 |
| 5,173,374 A | 12/1992 | Tiedemann et al. | |
| 5,385,793 A | 1/1995 | Tiedemann et al. | |
| 5,419,982 A | 5/1995 | Tura et al. | |
| 5,434,017 A | 7/1995 | Berkowitz et al. | |
| 5,439,760 A | 8/1995 | Howard et al. | |
| 5,443,925 A | 8/1995 | Machida et al. | |
| 5,462,819 A | 10/1995 | Jacus et al. | |
| 5,501,916 A | 3/1996 | Teramoto et al. | |
| 5,658,683 A | 8/1997 | Kageyama et al. | |
| 5,702,840 A | 12/1997 | Byon | |
| 5,800,942 A * | 9/1998 | Hamada et al. | 429/148 |
| 5,912,091 A | 6/1999 | Daio et al. | |
| 5,916,704 A | 6/1999 | Lewin et al. | |
| 6,040,086 A | 3/2000 | Yoshida et al. | |
| 6,051,336 A | 4/2000 | Dougherty et al. | |
| 6,078,163 A | 6/2000 | Horie et al. | |
| 6,093,503 A | 7/2000 | Isoyama et al. | |
| 6,114,059 A | 9/2000 | Watanabe et al. | |
| 6,132,900 A | 10/2000 | Yoshizawa et al. | |
| 6,190,794 B1 | 2/2001 | Wyser | |
| 6,255,015 B1 | 7/2001 | Corrigan et al. | |
| 6,265,091 B1 | 7/2001 | Pierson et al. | |
| 6,274,264 B1 | 8/2001 | Azema | |
| 6,317,248 B1 | 11/2001 | Agrawal et al. | |
| 6,326,103 B1 * | 12/2001 | Ido et al. | 429/156 |
| 6,337,154 B1 | 1/2002 | Jacobs et al. | |
| 6,340,311 B1 | 1/2002 | Hamada et al. | |
| 6,348,283 B1 | 2/2002 | Mas et al. | |
| 6,365,297 B1 | 4/2002 | Wolczak et al. | |
| D457,131 S | 5/2002 | Kitoh et al. | |
| 6,392,172 B1 | 5/2002 | Azema | |
| 6,399,238 B1 | 6/2002 | Oweis et al. | |
| 6,399,242 B2 | 6/2002 | Kitoh et al. | |
| 6,399,298 B1 | 6/2002 | Li et al. | |
| 6,403,250 B1 | 6/2002 | Azema et al. | |
| 6,403,262 B1 | 6/2002 | Xing et al. | |
| 6,406,815 B1 | 6/2002 | Sandberg et al. | |
| 6,410,185 B1 * | 6/2002 | Takahashi et al. | 429/163 |
| 6,440,604 B1 | 8/2002 | Inoue et al. | |
| 6,479,185 B1 | 11/2002 | Hilderbrand et al. | |
| 6,479,294 B1 | 11/2002 | Fong et al. | |
| 6,492,060 B1 * | 12/2002 | Timmons | 429/179 |
| 6,524,738 B1 | 2/2003 | Lee et al. | |
| 6,537,704 B1 | 3/2003 | Akashi et al. | |
| 6,586,131 B2 | 7/2003 | Hallifax et al. | |
| 6,617,823 B2 | 9/2003 | O'Connell | |
| 6,663,992 B2 | 12/2003 | Lehnert et al. | |
| 6,666,263 B2 | 12/2003 | Luz et al. | |
| 6,689,510 B1 | 2/2004 | Gow et al. | |
| 6,713,211 B2 | 3/2004 | Morishita et al. | |
| 6,730,430 B2 | 5/2004 | Chang | |
| 6,733,918 B2 * | 5/2004 | Hamada et al. | 429/94 |
| 6,737,188 B2 | 5/2004 | Stec | |
| 6,761,992 B1 | 7/2004 | Marukawa et al. | |
| 6,761,996 B1 | 7/2004 | Kim et al. | |
| 6,767,666 B2 | 7/2004 | Nemoto et al. | |
| 6,811,902 B2 | 11/2004 | Benson et al. | |
| 6,819,081 B2 | 11/2004 | Izawa et al. | |
| 6,821,671 B2 | 11/2004 | Hinton et al. | |
| 6,844,110 B2 | 1/2005 | Enomoto et al. | |
| 2001/0049054 A1 | 12/2001 | Enomoto et al. | |
| 2002/0012833 A1 | 1/2002 | Gow et al. | |
| 2002/0025474 A1 | 2/2002 | Chikada | |
| 2002/0044331 A1 | 4/2002 | Agrawal et al. | |
| 2002/0106550 A1 | 8/2002 | Nishiki et al. | |
| 2003/0013007 A1 | 1/2003 | Kaun | |
| 2003/0017387 A1 | 1/2003 | Marukawa et al. | |
| 2003/0064285 A1 | 4/2003 | Kawamura et al. | |
| 2003/0091896 A1 | 5/2003 | Watanabe et al. | |
| 2003/0104281 A1 | 6/2003 | Frustaci et al. | |
| 2003/0124419 A1 | 7/2003 | Ito et al. | |
| 2003/0141842 A1 | 7/2003 | Izawa et al. | |
| 2003/0143459 A1 | 7/2003 | Kunimoto et al. | |
| 2003/0151388 A1 | 8/2003 | Shimamura et al. | |
| 2003/0162084 A1 | 8/2003 | Shigeta et al. | |
| 2003/0165734 A1 | 9/2003 | Hinton et al. | |
| 2003/0170535 A1 | 9/2003 | Watanabe et al. | |
| 2003/0186095 A1 | 10/2003 | Okutani et al. | |
| 2003/0194605 A1 | 10/2003 | Fauteux et al. | |
| 2003/0224246 A1 | 12/2003 | Watanabe et al. | |
| 2003/0232239 A1 | 12/2003 | Gow et al. | |
| 2004/0002001 A1 | 1/2004 | Watanabe | |
| 2004/0009334 A1 | 1/2004 | Miyamoto et al. | |
| 2004/0016455 A1 | 1/2004 | Oogami | |
| 2004/0023107 A1 | 2/2004 | Nakanishi et al. | |
| 2004/0028996 A1 | 2/2004 | Hamamoto et al. | |
| 2004/0053115 A1 | 3/2004 | Skinlo | |
| 2004/0058233 A1 | 3/2004 | Hamada et al. | |
| 2004/0058236 A1 | 3/2004 | Tsukamoto et al. | |
| 2004/0091783 A1 | 5/2004 | Cagle | |
| 2004/0110061 A1 | 6/2004 | Haug et al. | |
| 2004/0121195 A1 | 6/2004 | Ghantous et al. | |
| 2004/0137314 A1 | 7/2004 | Fukui | |
| 2004/0145352 A1 | 7/2004 | Harrison | |
| 2004/0161662 A1 | 8/2004 | Kim et al. | |
| 2004/0166727 A1 | 8/2004 | Ling et al. | |
| 2004/0170887 A1 | 9/2004 | Masumoto et al. | |
| 2004/0191611 A1 | 9/2004 | Imachi et al. | |
| 2004/0197659 A1 | 10/2004 | Kumar et al. | |
| 2004/0251872 A1 | 12/2004 | Wang et al. | |
| 2004/0258997 A1 | 12/2004 | Utsugi et al. | |
| 2005/0007068 A1 | 1/2005 | Johnson et al. | |
| 2005/0008941 A1 | 1/2005 | Kim et al. | |

FOREIGN PATENT DOCUMENTS

| | | | |
|---|---|---|---|
| EP | 0771 037 B1 | 5/1997 | |
| EP | 0771037 A1 | 5/1997 | |
| EP | 1030388 A1 | 8/1999 | |
| EP | 0 952 620 B1 | 10/1999 | |
| EP | 0952 620 B1 | 10/1999 | |
| EP | 0952620 A1 | 10/1999 | |
| EP | 1091438 A2 | 11/1999 | |
| EP | 1 030 388 A1 | 8/2000 | |
| EP | 1 143 541 A1 | 10/2001 | |
| EP | 1143541 A1 | 10/2001 | |
| EP | 2360756 A1 | 8/2011 | |
| GB | 2 122 413 | 1/1984 | |
| JP | 57-163965 | 10/1982 | |
| JP | 59-154741 | 9/1984 | |
| JP | 59-154742 | 9/1984 | |
| JP | 59-154743 | 9/1984 | |
| JP | 59-154744 | 9/1984 | |
| JP | 02056852 A * | 2/1990 | H01M 2/28 |
| JP | 07192775 A * | 7/1995 | H01M 10/52 |
| JP | 7-296790 | 11/1995 | |
| JP | 8-111214 | 4/1996 | |
| JP | 11-167929 | 6/1999 | |
| JP | 2001256959 A * | 9/2001 | H01M 2/30 |
| JP | 2002-8617 | 1/2002 | |

OTHER PUBLICATIONS

Espacenet.com Abstract for Yang, CN 2399831 Y.*
Machine Translation for Imai et al., JP 2001-256959 A.*
Written Opinion of the International Searching Authority of International Application PCT/US2004/035872; 5 pages.
International Search Report for International Application No. PCT/US2004/035872; 3 pages; mailed May 4, 2005.
International Search Report for PCT US2004/035872, date of mailing May 4, 2005, 4 pages.
Communication under Rule 71(3) EPC for European Application No. 04810090.3, mail date Mar. 3, 2011, 6 pages.
Extended European Search Report for European Application No. 10011929.6, mail date Jun. 30, 2011, 5 pages.

* cited by examiner

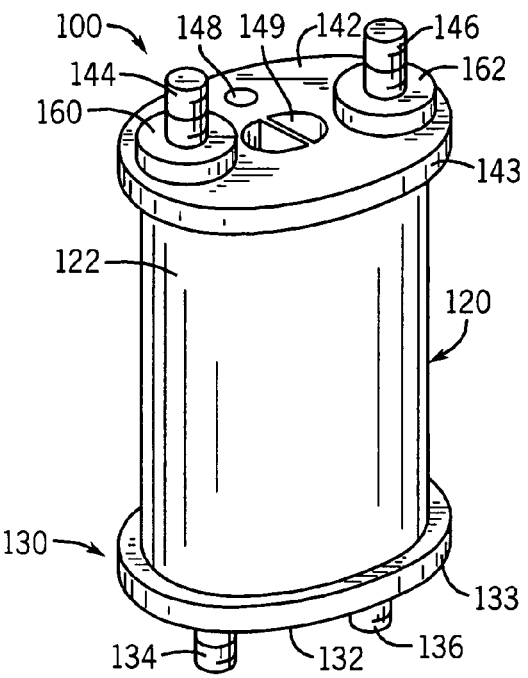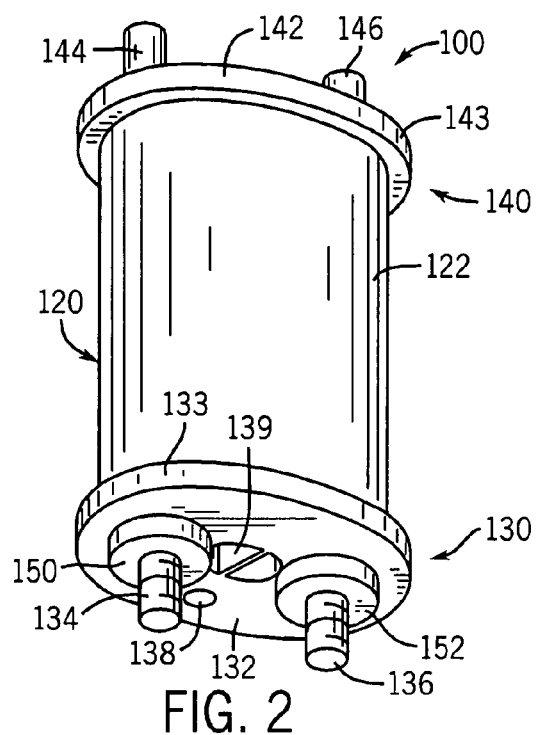
FIG. 1　　　FIG. 2
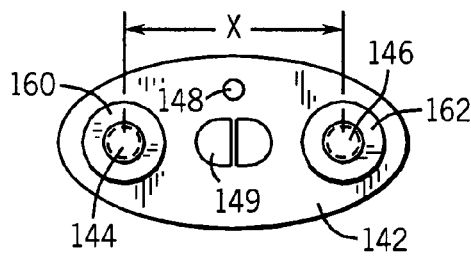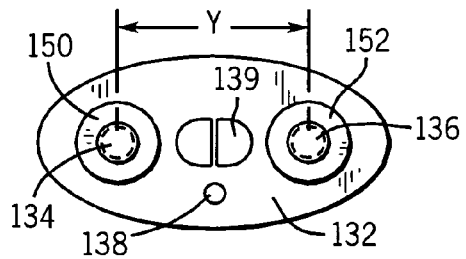
FIG. 3　　　FIG. 4

FIG. 9　　　FIG. 10
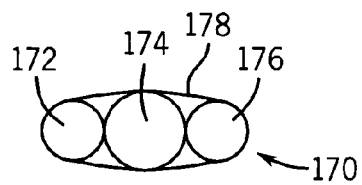
FIG. 11　　　FIG. 12

BATTERY SYSTEM INCLUDING BATTERIES THAT HAVE A PLURALITY OF POSITIVE TERMINALS AND A PLURALITY OF NEGATIVE TERMINALS

CROSS-REFERENCE TO RELATED APPLICATIONS

The present application claims the benefit of priority under 35 U.S.C. §119(e) of (and also expressly incorporates by reference herein in its entirety) the following related application: U.S. Provisional Patent Application No. 60/515,346 filed Oct. 28, 2003.

STATEMENT REGARDING FEDERALLY SPONSORED RESEARCH OR DEVELOPMENT

The Government of the United States has rights in this invention pursuant to Contract No. DE-FC26-95EE50425 awarded by the U.S. Department of Energy.

BACKGROUND

The present inventions generally relate to a battery system. The present inventions also relate to a battery system comprising a module and at least one cell. The present inventions also relate to a battery system comprising a battery of a type comprising a lithium battery cell (e.g., a lithium-ion, lithium-polymer or the like).

Various battery systems have been used in vehicles such as automobiles. It is also known to provide for a battery system that is used at least in some combination with other systems (such as an internal combustion engine) to provide power for the vehicle. For example, it is known to provide a hybrid-electric vehicle having a battery system and an internal combustion that operate in combination to power the vehicle. In such known vehicles, the battery system may typically comprise a nickel metal-hydride battery.

It is also known to provide a battery system comprising a lithium battery. It is generally known that lithium batteries may perform differently than nickel metal-hydride batteries. In some applications, it may be desirable to obtain the enhanced power/performance of a lithium battery (e.g., a lithium ion or lithium polymer). However, the application of lithium battery technology may present design and engineering challenges beyond those typically presented in the application of conventional nickel metal-hydride battery technology.

The design and management of a lithium battery system that can be advantageously applied in a hybrid vehicle may involve considerations such as electrical performance monitoring, thermal management, and containment of effluent (e.g., gases that may be vented from a battery cell).

Accordingly, it would be advantageous to provide a battery system configured to allow the use of lithium battery technology in a hybrid vehicle. It would also be advantageous to provide a battery system using lithium battery technology that is configured to allow for monitoring of electrical performance, for example, by allowing the interconnection of a monitoring or control circuit or system. It would further be advantageous to provide a battery system using lithium battery technology that is configured to allow thermal management, for example, by attempting to enhance the conduction and transfer of heat from one or more battery cells. It would further be advantageous to provide a battery system using lithium battery technology that is configured to contain effluent gases that may be vented from a battery cell, for example, by allowing such gases to be captured in a chamber. It would further be advantageous to provide a battery system where a battery module can be assembled using cells having a modular configuration and/or allowing for interchangeable assembly into the module. It would further be advantageous to provide a battery system comprising a module configured to achieve substantial uniformity of temperature across the cells. It would further be advantageous to provide a battery system comprising a module and/or cells configured to provide one or more of these or other advantageous features.

SUMMARY

The present invention relates to a lithium battery for use in a vehicle that includes a container, a plurality of positive terminals extending from a first end of the lithium battery, and a plurality of negative terminals extending from a second end of the lithium battery. The plurality of positive terminars are provided in a first configuration and the plurality of negative terminals are provided in a second configuration, the first configuration differing from the second configuration. A battery system for use in a vehicle may include a plurality of electrically connected lithium cells or batteries.

The present invention also relates to a battery system for use in a vehicle that includes a plurality of electrically connected lithium batteries, each of the plurality of lithium batteries including a plurality of positive terminals extending from a first end thereof and a plurality of negative terminals extending from a second end thereof.

The present invention also relates to a system for providing power for a vehicle that includes a plurality of lithium-ion cells electrically connected in series, each of the plurality of lithium-ion cells including a plurality of positive terminals extending from a first end thereof and a plurality of negative terminals extending from a second end thereof. The system also includes means for directing a fluid past the plurality of positive terminals and the plurality of negative terminals to remove heat from the plurality of lithium-ion cells.

The present invention also relates to a lithium battery system that includes a module that includes a plurality of electrically connected cells, each having a first terminal set and a second terminal set. The module also includes a path for heat transfer across the first terminal set of each of the plurality of cells and a path configured to direct a flow of effluent from at least one of the plurality of cells.

BRIEF DESCRIPTION OF THE DRAWINGS

FIG. 1 is a perspective view of a cell according to an exemplary embodiment.

FIG. 2 is another perspective view of the cell shown in FIG. 1.

FIG. 3 is a top plan view of the cell shown in FIG. 1.

FIG. 4 is a bottom plan view of the cell shown in FIG. 1.

FIG. 9 is a schematic view illustrating the cross-sectional shape of a cell according to an exemplary embodiment.

FIG. 10 is a schematic view illustrating the cross-sectional shape of a cell according to an exemplary embodiment FIG. 11 is a schematic view illustrating the cross-sectional shape of a cell according to an exemplary embodiment FIG. 12 is a schematic view illustrating a system of mandrels utilized to produce a cell similar to that shown in FIG. 9.

DETAILED DESCRIPTION OF EXEMPLARY EMBODIMENTS

Figure 5:
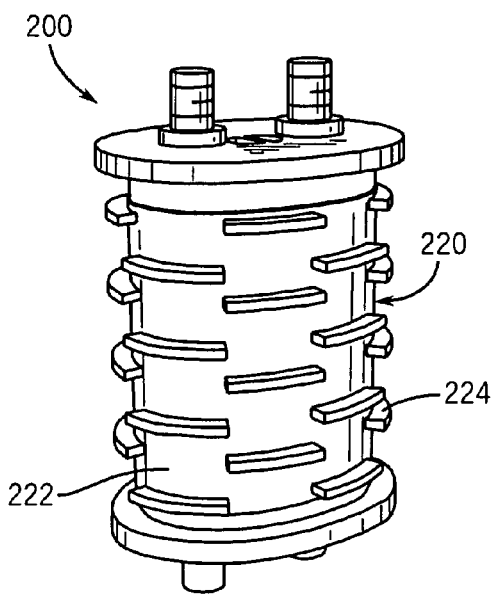
FIG. 5 is a perspective view of a cell according to an exemplary embodiment.

According to an exemplary embodiment, a battery system comprises a module or system of modules. Each module is configured to comprise a plurality of cells (e.g., battery/voltage cells, such as in the form of lithium-ion cells, lithium-polymer cells, etc. of any presently known configuration or other configuration that may be developed in the future for a lithium cell). According to various exemplary embodiments, the number of cells provided in the module may be varied according to design objectives and considerations. For example, according to one exemplary embodiment, a system may be configured to include a module that includes ten cells. It should also be noted that a system may be configured to include more than one module (e.g., two or three or more modules), and the number of cells may be varied in each of the modules in the system.

FIGS. 1 through 4 show a cell 100 according to an exemplary embodiment. According to an exemplary embodiment, cell 100 includes a container 120 (e.g., as may be provided in the form of a canister, housing, casing, holder, etc.), a first cover 132 (which may be referred to and/or be provided in the form of, for example, as an end cover, collar, cap, top portion, end portion, etc.) provided at a first end 130 of cell 100, and a second cover 142 (which may be referred to and/or be provided in the form of, for example, as an end cover, collar, cap, top portion, end portion, etc.) provided at a second end 140 of cell 100.

According to an exemplary embodiment, covers 132 and 142 will set or provide spacing between adjacent cells when the cells are positioned within a module. For example, covers 132 and 142 are shown in FIG. 1 as extending laterally to a greater extent than that of container 120; in the event that cell 100 is placed adjacent a similar cell, covers 132 and 142 would come into contact with similar covers on an adjacent cell to prevent contact between container 120 and the container of the adjacent cell (thus preventing direct electrical contact between the containers of adjacent cells).

According to an exemplary embodiment, covers 132 and 142 are intended to provide enhanced structural rigidity for cell 100. For example, cover 132 and cover 142 may be coupled or attached to container 120 (e.g., using an adhesive, by welding such as laser welding, etc.) in a manner which provides enhanced stiffness or strength for the container and cover assembly. Cover 132 and cover 142 may also be configured to hold the terminals (e.g., terminals 134, 136, 144, 146) in place and to allow cell 100 to engage the module structure (e.g., as opposed to utilizing the terminals to engage the module structure). Covers 132 and 142 may also be configured to allow the use of electronics for measuring temperature and/or voltage of the cells.

According to various exemplary embodiments, the covers may be made from any suitable material (e.g., metals, plastics, composites, etc.). According to a particular exemplary embodiment, cover 132 and cover 142 could be made from a suitable plastic or a polymeric material such as polypropylene or Noryl™ commercially available from GE Plastics of Pittsfield, Mass.

According to an exemplary embodiment, the covers do not seal the cells; a separate cover (e.g., a metal cover) may be positioned under the covers to seal the cell. According to another exemplary embodiment, covers coupled to the container may act as seals for the cell, thus eliminating the need to provide a separate cover (e.g., a metal cover) for sealing the cell.

According to an exemplary embodiment shown in FIGS. 1-4, cell 100 includes one or more vent ports (shown, e.g., as vent ports 138 and 148) configured for allowing effluent (e.g., gas, liquid, and/or other materials) to escape (e.g., to be exhausted or expressed from) the interior of cell 100. Vent ports 138 and 148 are shown as being provided in covers 132 and 142 near outer edges 133 and 143 of covers 132 and 142, respectively. By providing vent ports 138 and 148 near outer edges 133 and 143 of covers 132 and 142, cell 100 may be configured to allow venting on a side of a module in which it is installed. According to other exemplary embodiments, the vent ports may be located at any other suitable location on the covers (e.g., near the center of a cover).

While vent ports 138 and 148 are shown in FIGS. 1-4 as apertures provided in covers 132 and 142, venting may be accomplished using tubes or other systems which allow the venting or exhaust of effluent from within the cell. Vent ports 138 and 148 (or other structures utilized to perform a similar function) may be configured to allow venting of effluent from within cell 100 to a path or passage such as a channel or other structure provided within a battery module to allow removal of effluent other materials to a location away from the cells and/or the module in which such cells are provided. According to other exemplary embodiments, vent ports 138 and 148 may be coupled to tubes, hoses, or other structures configured to allow the removal of effluent to a location away from the cells and/or a module in which such cells are provided.

According to another exemplary embodiment, the vent ports may include a valve such as relief or burst valve to permit effluent to escape the cells. Such valves may be configured to allow gas and/or other materials to escape from the cell when the pressure within the cell reaches a particular threshold (e.g., a high pressure threshold of between approximately 3 psi and 30 psi). According to various other exemplary embodiments, the vent ports and valves may be separate components that may be coupled together and are configured to provide venting with a battery module.

According to an exemplary embodiment, vent ports 138 and 148 extend from the interior of cell 100 to the exterior of cell 100 and may provide a path for flow of effluent outward (e.g., away from the interior structure of the cell including a winding mandrel utilized to provide a structure about which electrodes and separators included within the cell may be wound or wrapped).

Two terminals or posts 134 and 136 extend from first end 130 of cell 100, and two terminals or posts 144 and 146 extend from second end 140 of cell 100. According to an exemplary embodiment, terminals 134 and 136 are positive terminals and terminals 144 and 146 are negative terminals for cell 100. It is intended that by having a plurality (e.g., two or more) of terminals in a terminal set for a cell, the cell would be provided with enhanced symmetric thermal conductivity (e.g., and possibly enhanced current distribution within the cell) in comparison with a cell having only a single positive terminal and a single negative terminal.

According to an exemplary embodiment, terminals 134 and 136 are separated from each other by a distance that differs from the distance between terminals 144 and 146. For example, as shown in FIGS. 3 and 4, the centers of terminals 144 and 146 (the negative terminals) are separated by a distance (shown as "X") that is greater than the distance (shown as "Y") separating the centers of terminals 134 and 136 (the positive terminals). According to another exemplary embodiment, the positive terminals are further apart than the negative terminals.

Providing the cell with positive terminals that are separated from each other by a distance that differs from the distance separating the negative terminals is intended to provide an assurance that the cells will be installed within a module in a correct orientation (e.g., the distinct difference in distances between each set of terminals will not allow improper insertion of the cell within the module, which may include connectors or other features that are configured to engage either the positive or negative terminals). According to another exemplary embodiment, the terminals may be provided at other locations than those shown in FIGS. 1-4. For example, one terminal set may be provided as shown, for example, in FIG. 3, while another set may be provided in an orientation that is ninety degrees from these terminals (e.g., along the small axis of the oval shown in FIG. 4). Any of a variety of other configurations may be used such that the positive and negative terminals are provided in a different configuration from each other (e.g., so that the cells may only be provided in a module in a particular orientation.).

According to an exemplary embodiment, terminals 134, 136, 144, and 146 are configured both to conduct electricity as part of the battery system and also to assist in removing heat from cell 100. It is believed that a relatively significant amount of heat may be removed from cell 100 through terminals 134, 136, 144, and 146, which are coupled or connected to the interior of cell 100. According to an exemplary embodiment, terminals 134, 136, 144, and 146 are made from a conductive material such as a metal (e.g., aluminum, copper, nickel-plated steel, or other suitable alloys). When a fluid (e.g., a gas such as air, a liquid such as a silicone oil, a fluorosilicate oil, mineral oil or another suitable coolant that is relatively non-ionic and having a relatively high dielectric constant, either now known or developed in the future) is passed across the terminals that is at a lower temperature than the temperature of the terminals (which conduct heat from within cell 100), it is believed that heat may be removed in the fluid stream from the terminals, and hence, from within the cell. According to one exemplary embodiment, the terminals may be positioned within a space such as a channel (e.g., provided within a battery module) through which a fluid such as a gas or liquid may flow across the terminals to allow for cooling of the terminals. According to another exemplary embodiment, terminals (e.g., the positive terminals) may be welded to container 120 to allow the transfer of heat through the terminals.

Container 120 may optionally include features such as dimples or other features provided on an external surface 122 thereof that may be intended to provide enhanced cooling for cell 100. FIGS. 5 through 8 are intended to illustrate various exemplary embodiments in which features are provided on an external surface of containers similar to container 120. According to an exemplary embodiment, a fluid such as air passed by container 120 is intended to be disrupted to create a turbulent (as opposed to laminar) flow adjacent container 120, which may facilitate removal of heat from the external surface of the container. For example, FIG. 5 shows a cell 200 having a container 220. A number of members 224 (shown in the form of fins) extend from a surface 222 of container 220. Fins 224 extend longitudinally along surface 222 and are arranged such that they extend radially from the center of cell 200. Each of fins 224 are generally rectangular in cross-section, although the cross-section of fins used in other exemplary embodiments may differ (e.g., the cross-section may be rounded or semicircular, triangular, etc.).

Figure 6:
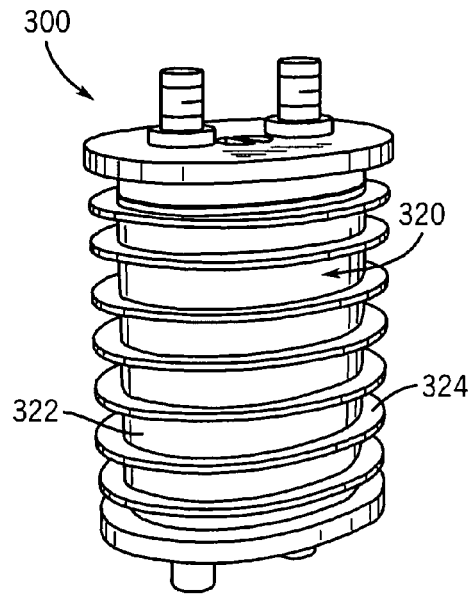
FIG. 6 is a perspective view of a cell according to an exemplary embodiment.

FIG. 6 shows a cell 300 having a container 320. A number of members 324 (shown in the form of fins) extend from a surface 322 of container 320. Each of fins 324 extend partially circumferentially about the surface 322 (e.g., fins 324 do not extend around the entire outer surface of container 320). Fins 324 are also arranged in a staggered relationship relative to fins provided in adjacent layers. For example, fin 326 is offset from fin 328. Each of fins 324 are generally rectangular in cross-section, although the cross-section of fins used in other exemplary embodiments may differ (e.g., the cross-section may be rounded or semicircular, triangular, etc.).

Figure 7:
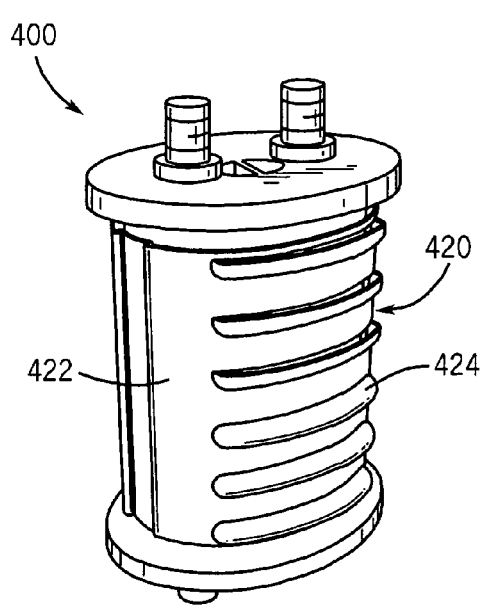
FIG. 7 is a perspective view of a cell according to an exemplary embodiment.

FIG. 7 shows a cell 400 having a container 420. A number of members 424 (shown in the form of fins) extend from a surface 422 of container 420. Each of fins 424 extend circumferentially about the surface 422 (e.g., unlike fins 324 shown in FIG. 6, fins 424 extend around the entirety of the surface 422 of container 420). Each of fins 424 are generally rectangular in cross-section, although the cross-section of fins used in other exemplary embodiments may differ (e.g., the cross-section may be rounded or semicircular, triangular, etc.).

Figure 8:
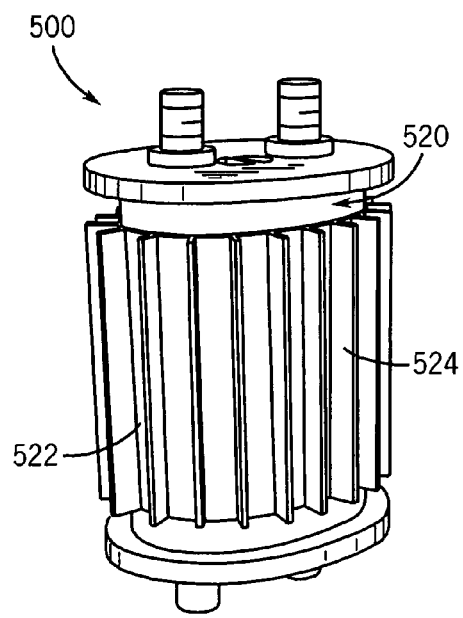
FIG. 8 is a perspective view of a cell according to an exemplary embodiment.

FIG. 8 shows a cell 500 having a container 520. A number of rounded members 524 extend from a surface 522 of container 520. Each of rounded members 524 extend partially circumferentially about the surface 522 (e.g., rounded members 524 do not extend around the entire outer surface of container 520). Rounded members 524 are arranged such that a portion 521 of container 520 includes no rounded members 524 provided thereon. Each of rounded members 524 are generally semi-circular in cross-section, although the cross-section of members used in other exemplary embodiments may differ.

According to an exemplary embodiment shown in FIGS. 1-4, cell 100 may include members or elements 150, 152, 160, and 162 in the form of bushings provided in contact with terminals 134, 136, 144, and 146. Such bushings may be configured for transferring heat from the terminals (and hence, from within cell 100). For example, bushings 150, 152, 166, and 162 may be made from metal or another conductive material. According to other exemplary embodiments, the bushings may be made from a variety of other materials such as polymeric materials, ceramic materials, composites, etc. According to various other exemplary embodiments, no bushings are provided adjacent the terminals.

According to an exemplary embodiment, cell 100 includes an aperture or hole 139 provided in cover 132 and an aperture or hole 149 provided in cover 142. Apertures 139 and 149 may be configured to allow heat to be removed from the interior of cell 100 (e.g., the apertures may be configured to act as vents for dissipating heat) according to an exemplary embodiment in which the center of the cell is hollow.

According to an exemplary embodiment, cell 100 is configured such that heat transfer (e.g., dissipation) in a 10 ampere-hour (Ah) battery may be on the order of about: (1) approximately 1 to 3 W/M-deg K in the radial or lateral direction; and (2) approximately 10 to 30 W/M-deg K in the axial or longitudinal direction. According to various other exemplary embodiments, heat transfer characteristics may vary.

Container 120 may be made from any suitable material, such as a metal, a polymeric material, a composite material, etc. According to an exemplary embodiment, container 120 is made from aluminum or an aluminum alloy. According to another exemplary embodiment, container 120 is made from steel. According to various other exemplary embodiments, the container may be made from other metals, such as nickel, nickel alloys, titanium, titanium alloys, and/or other metals and metal alloys.

According to an exemplary embodiment, the container is electrically insulated (e.g., isolated) from electrodes included within the container. For example, plastic (or other suitable insulating materials) may be placed in the container to provide adequate insulation between the container and the electrodes.

Container 120 may have any of a variety of shapes, sizes, and configurations. For example, the container may be octagonal, cylindrical, generally flattened-oval, octal-oval, prismatic, or any of a variety of other shapes. FIGS. 9 through 11 illustrate several possible configurations for the container according to various exemplary embodiments. According to an exemplary embodiment, the cell has a symmetrical shape that optimizes performance and/or heat dissipation (e.g., provides a uniform temperature throughout the cell).

As shown in FIGS. 1 through 4, container 120 has a generally oval shape or profile according to an exemplary embodiment. One advantageous feature of providing container 120 with a generally oval shape is that the surface area of outer surface 122 of container 120 is greater than that of a comparable cylindrical-shaped container, which may allow for increased heat transfer from the cell through container 120. Another advantageous feature of providing a container having a generally oval shape is that the thickness or width of the container is smaller than a cylindrical cell (i.e., with the thickness or width corresponding to the smallest axis of the container).

Figure 15:
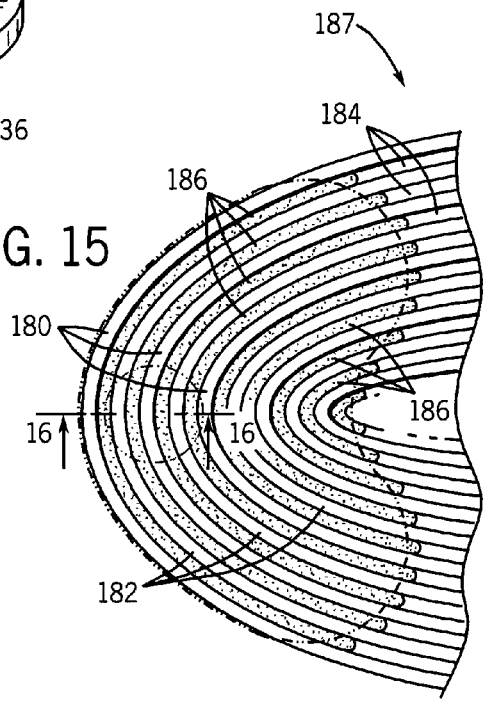
FIG. 15 is a schematic view of a portion of a cell showing the electrodes and a material for preventing sputtering of material between the electrodes according to an exemplary embodiment.

As shown in FIG. 15, included within container 120 are at least one positive electrode 180, at least one negative electrode 182, and a separator 184 provided intermediate or between the positive electrode and negative electrode. The electrodes and the separators are wound or wrapped such that they have a generally oval or elliptical shape (or other shape, depending on the shape of the container used) to form a cell element.

The cell element may be created by using a winding mandrel 170 such as that shown in FIG. 12. According to an exemplary embodiment such as that shown in FIGS. 1 through 2 and 9 in which container 120 has a generally oval shape, mandrel 170 may be created by utilizing two equally sized cylindrical elements having circular cross-sections (shown as elements 172 and 176 in FIG. 12) that abut a larger cylindrical element having a circular cross-section (shown as element 174 in FIG. 12). For example, according to an exemplary embodiment, element 174 has a cross-sectional radius of between approximately 120 and 160 percent of the cross-sectional radius of elements 172 and 176. The circumference around the circles (shown as reference numeral 178) shows the overall cross-sectional shape of winding mandrel 178. The relative sizes of the various elements (e.g., elements 172, 174, and 176) may be adjusted according to various exemplary embodiments to obtain a desired shape for the cell elements to be provided within container 120.

According to an exemplary embodiment, the mandrel (e.g., mandrel 170) may be left within the cell after winding the cell element. According to various other exemplary embodiments, the mandrel may be removed after winding the cell. According to an exemplary embodiment, after winding, there is a space within the core of the cell that remains unused (e.g., a hollow space).

The mandrel may be made from any type of material (e.g., a metal, a polymeric material, a composite material, etc.). According to an exemplary embodiment, the mandrel is made of a polymeric material and may be configured to expand under elevated heat and/or pressure to allow for better cell compression during manufacturing of the cell. According to another exemplary embodiment, the mandrel is made of a polymeric material and/or construction (structural design) and is configured to collapse under increased heat (e.g., a temperature of between approximately 85 and 105 degrees Celsius (or some other predetermined temperature)) to absorb pressure that may be developing within the cell and/or to lessen the integrity of the winding, which is intended to reduce the internal element pressure and increase resistance of the cell element.

Figure 13:
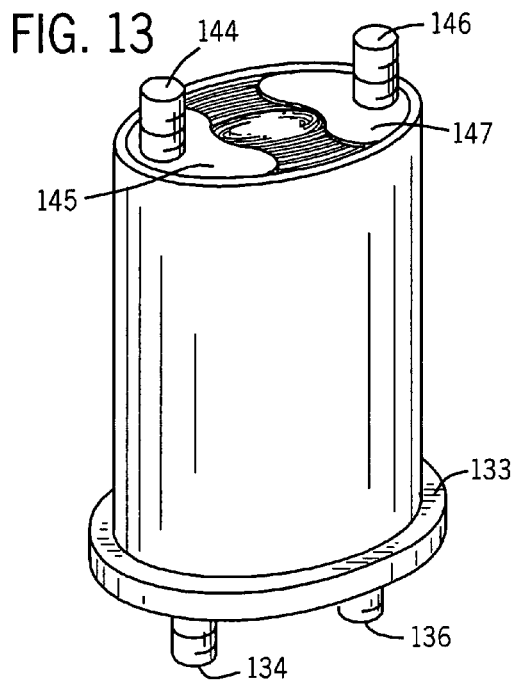
FIG. 13 is an perspective view of a cell similar to that shown in FIG. 1 having a cover removed to illustrate a portion of the interior of the cell according to an exemplary embodiment.

According to an exemplary embodiment, cell 100 may include an element or member (e.g., a strap) that is coupled to the terminals and to electrodes included within the cell. For example, as shown in FIG. 13, terminal 144 is coupled to a member or element 145 in the form of a strap (e.g., having a generally crescent shape), and terminal 146 is coupled to a member or element 147 in the form of a strap having a similar configuration to member or element 145. Members 145 and 147 may be configured to gather or collect current and/or heat from within cell 100. While members 145 and 147 are illustrated as having a generally crescent shape, other shapes may be utilized (e.g., a single member may be provided which extends over a smaller or greater area at the top of the cell and which is coupled to one or both of terminals 144 and 146). For example, members 145 and 147 may be of the type described in U.S. Pat. No. 6,221,524 issued Apr. 24, 2001 entitled "Strap for Thin Metal Film Battery" or U.S. Pat. No. 6,051,336 issued Apr. 18, 2000 entitled "Battery Case for Thin Metal Film Cells," the entire disclosures of which are incorporated herein by reference. According to various exemplary embodiments, the straps may be coupled to the cell by welding (e.g., laser welding), soldering, heat fusing, spot welding, etc. (or any other suitable coupling method). The straps may be coupled to each end of the cell (e.g., each end of the wound roll of electrodes). According to an exemplary embodiment, each member (e.g., members 145 and 147) contact only one electrode polarity type (e.g., only negative electrodes or only positive electrodes).

Figure 14:
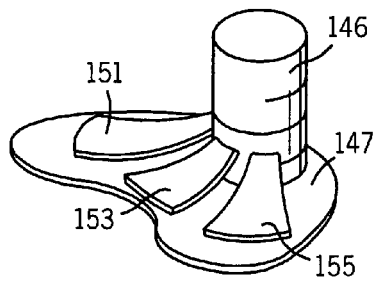
FIG. 14 is a perspective view of a terminal assembly similar to that shown in FIG. 13 and having a number of members coupled to the terminal according to an exemplary embodiment.

To provide additional heat and/or current transfer from cell 100, one or more members (e.g., members 151, 153, and 155 as shown in FIG. 14) may be provided that provide a thermal and/or electrical contact between member 147 and terminal 146. A similar configuration may be used for the other terminals and straps of cell 100. Members 151, 153, and 155 are shown as extensions or fins which extend between member 147 and terminal 146. The particular configuration shown in FIG. 14 is not considered to be limiting, and other members having a variety of different shapes, sizes, and/or configurations may be utilized in conjunction with a terminal of a battery. As shown in FIG. 14, members 151 and 155 extend a greater distance from terminal 146 than does member 153. In this manner, members 151 and 155 extend further along member 147 (e.g., proximate the ends of member 147). According to an exemplary embodiment, the size, shape, and/or configuration of members extending between terminal 146 and member 147 may be optimized to provide enhanced thermal and/or electrical conductivity between the interior of cell 100 and terminal 146.

Figure 16:
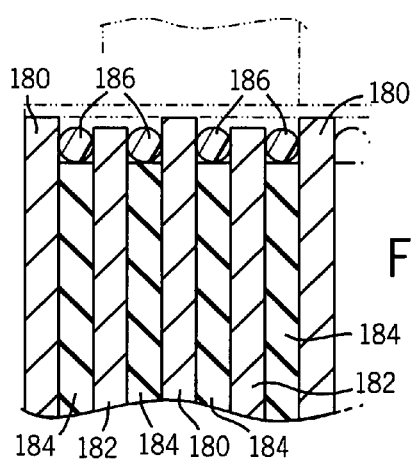
FIG. 16 is a schematic cross-sectional view of the portion of the cell shown in FIG. 15 according to an exemplary embodiment.

FIGS. 15 and 16 illustrate a portion of a cell (e.g., cell 100) to show a configuration of the interior of the cell according to an exemplary embodiment. Cell 100 includes a positive electrode or cathode 180, a negative electrode or anode 182, and a separator 184 provided intermediate or between positive electrode 180 and negative electrode 182. Positive electrode 180, negative electrode 182, and separator 184 are wrapped or wound to form a cell element 187 (e.g., around a mandrel such as mandrel 170 shown in FIG. 12).

According to an exemplary embodiment, positive electrode 180 includes a current collector made of a metal such as aluminum or an aluminum alloy. It should be noted that other materials, either currently known or developed in the future, may be utilized according to other exemplary embodiments. The positive current collector has a thickness of between approximately 10 and 50 microns according to an exemplary embodiment. An active material is provided on the positive current collector to allow lithium to become doped and undoped during charging and discharging of cell 10.

According to an exemplary embodiment, negative electrode 182 includes a current collector made of a metal such as copper or a copper alloy. It should be noted that other materials, either currently known or developed in the future, may be utilized according to other exemplary embodiments. The negative current collector has a thickness of between approximately 5 and 50 microns according to an exemplary embodiment. An active material is provided on the negative current collector to allow lithium to become doped and undoped during charging and discharging of cell 10.

Separator 184 may be made of a material such as polypropylene (PP), polyethylene (PE), polytetrafluoroethylene (PTFE) a multi-layer material such as tri-layer PP-PE-PP, or any other suitable separator material. Various separators are available commercially which may be used according to a variety of exemplary embodiments; according to alternative embodiments, any suitable material may be used for the separator.

While a variety of possible materials have been described as being suitable for use within cell 100, it should be noted that any of a variety of other materials may be used in addition to or in place of the materials described above.

According to an exemplary embodiment shown in FIGS. 15-16, an optional material 186 may be provided intermediate or between positive electrode 180 and negative electrode 182 (and above separator 184) in the form of a line or bead of material. Material 186 may be provided intermediate or between positive electrode 180 and negative electrode 182 only below regions where members 145 and 147 will be provided or may be provided along the entire top surface of cell 100. According to an exemplary embodiment, members 145 and 147 (FIG. 13) are welded (e.g., laser welded) to a top portion of positive electrode 180.

During the welding process, material may be ejected from members 145 and 147 (as shown in FIG. 13) which may enter the area between positive electrode 180 and negative electrode 182, which may undesirably cause a short between positive electrode 180 and negative electrode 182. To assist in reducing or eliminating the occurrence of material (e.g., metal) being ejected between positive electrode 180 and negative electrode 182, material 186 is provided to prevent material from entering the region between positive electrode 180 and negative electrode 182. According to an exemplary embodiment, material 186 is a hot melt material (e.g., an epoxy or other type of polymeric material) that is provided or deposited (e.g., extruded) between the battery electrodes only in the region where the battery terminal will be coupled to the electrodes (e.g., to allow electrolyte to flow through the remainder of the cell). It should be noted that other materials, either currently known or developed in the future, may be utilized according to other exemplary embodiments. According to another exemplary embodiment, material 186 may be provided between positive electrode 180 and negative electrode 182 around the entire top surface of cell 100 to prevent any material from entering the region between positive electrode 180 and negative electrode 182. According to another exemplary embodiment, no material is provided between positive electrode 180 and negative electrode 182 to prevent material from entering the region between the electrodes.

According to an exemplary embodiment, an electrolyte is provided within the cell that may include one or more of the following characteristics: (1) relatively high ionic conductivity; (2) relatively wide electrochemical window; (3) relatively high thermal stability; (4) relatively high chemical stability with battery components; (5) forming relatively favorable solid-electrolyte-interface layer on anode/cathode; (6) relatively non-toxic and environmentally friendly; and (7) relatively low cost.

The electrolyte (which may be provided in the area between positive electrode 180 and negative electrode 182 with separator 184) may include a solvent such as one or more of propylene carbonate (PC), dimethyl carbonate (DMC), diethyl carbonate (DEC), ethylene carbonate (EC), and any other suitable solvent or mixture of solvents (e.g., a binary mixture, a ternary mixture, etc.) (which may be provided in the area between positive electrode 180 and negative electrode 182 with separator 184). The electrolyte may also include one or more salt such as a lithium salt (e.g., $LiPF_6$, $LiBF_4$, $LiN(CF_3SO_3)_2$, LiBOB, etc.), an imide salt, or any other suitable salt. The electrolyte may also include phosphine additives to improve particular characteristics (e.g., to provide flame retardant properties, etc.) and/or other additives to increase cell performance through increasing stability and/or increased electrolyte safety. It should be noted that other materials, either currently known or developed in the future, may be utilized according to other exemplary embodiments.

A binder may be provided in the active materials that may provide one or more of the following characteristics: (1) relatively good adhesion; (2) relatively good coatability; (3) relatively good first cycle efficiency; (4) relatively good cyclability; (5) relatively good chemical stability; (6) relatively good thermal stability; (7) relatively good electrochemical stability; (8) relatively good processability; (9) relatively good wetability; and (10) relatively good safety. For example, a polyvinylidene fluoride (PVDF) binder may be used with the positive electrode active material, and styrene-butadiene rubber (SBR) may be used with the negative electrode active material.

According to an exemplary embodiment, to prepare the electrodes, the following steps may be used: (1) pre-treatment of raw materials; (2) weighing and load into mixer; (3) mixing; (4) viscosity control (and adjustment of viscosity); (5) coating; (6) solvent removal; (7) densification (e.g., roll press); (8) electrode drying; and (9) cell fabrication. The order of the steps may vary according to various exemplary embodiments, and various steps may be omitted according to other exemplary embodiments.

Cells having different ratings or battery systems utilizing a different number of cells may exhibit different attributes. The systems shown in the various FIGURES are intended to allow overall configuration and arrangement of cells that can achieve the functional requirements described above.

FIGS. 17 through 24 illustrate a battery system 600 that includes a module or assembly 602 which includes a plurality of batteries or cells 610 electrically coupled together. Module 602 includes a connector 690 having a center portion 692 and a connector 691 similar to connector 690 for electrically connecting the module to other modules and/or to a vehicle electrical system. While the embodiment illustrated in FIGS. 17 through 24 depicts a module 602 that includes 10 cells 610, the number of cells provided within a particular module may vary according to various exemplary embodiments (e.g., modules may include greater or less than 10 cells). Further, while system 600 is depicted as including a single module 602, it should be noted that battery systems may include any number of modules which include any number of batteries (e.g., three modules may be provided within a battery system, each of which may include any suitable number of cells). The particular configuration utilized for a battery system and/or module may be optimized to provide power for a particular application according to various exemplary embodiments.

Figure 17:
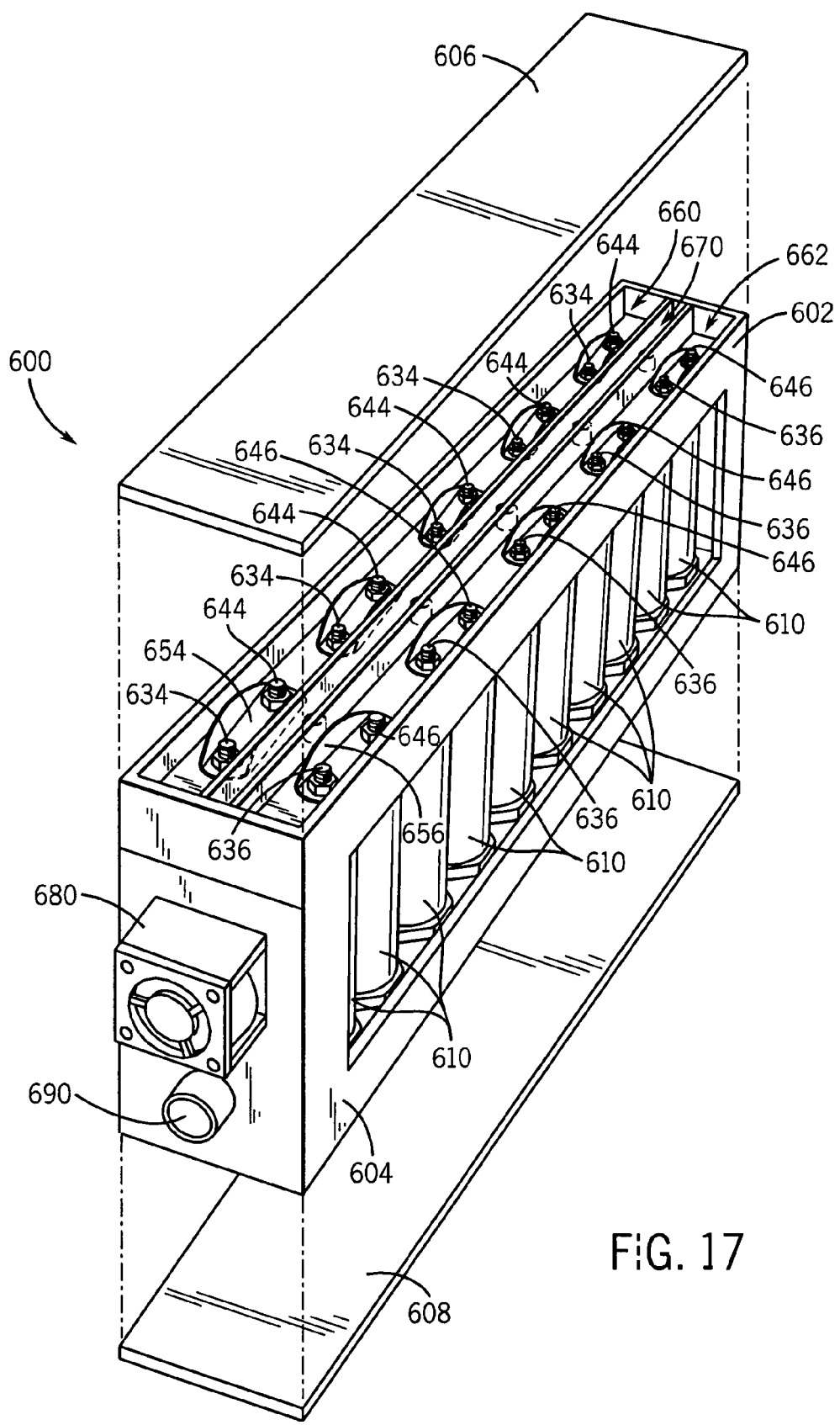
FIG. 17 is a partially exploded perspective view of a battery system according to an exemplary embodiment.
Figure 18:
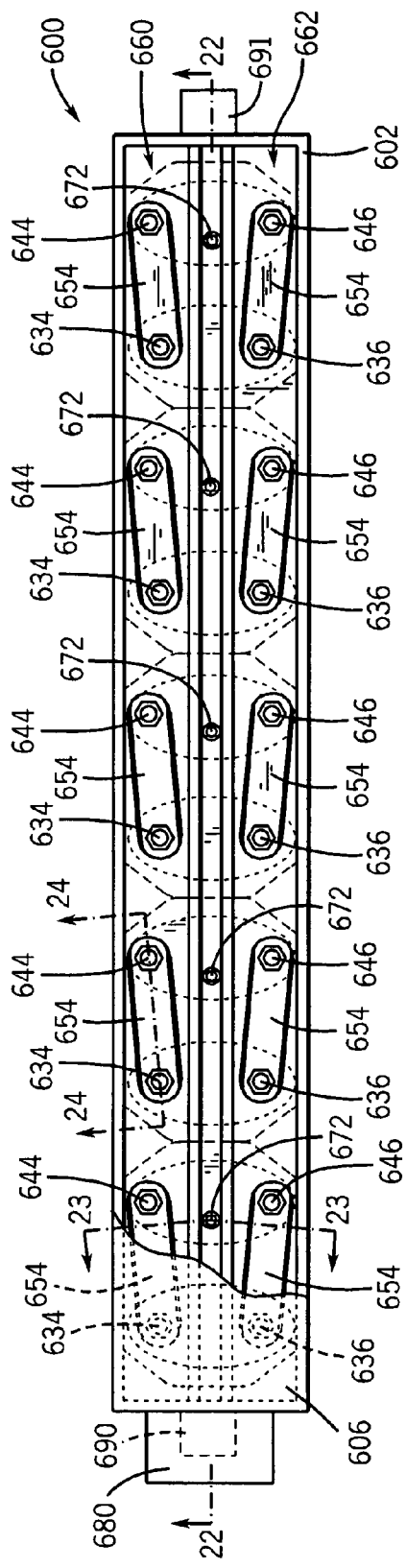
FIG. 18 is a top plan view of the battery system shown in FIG. 17.
Figure 19:
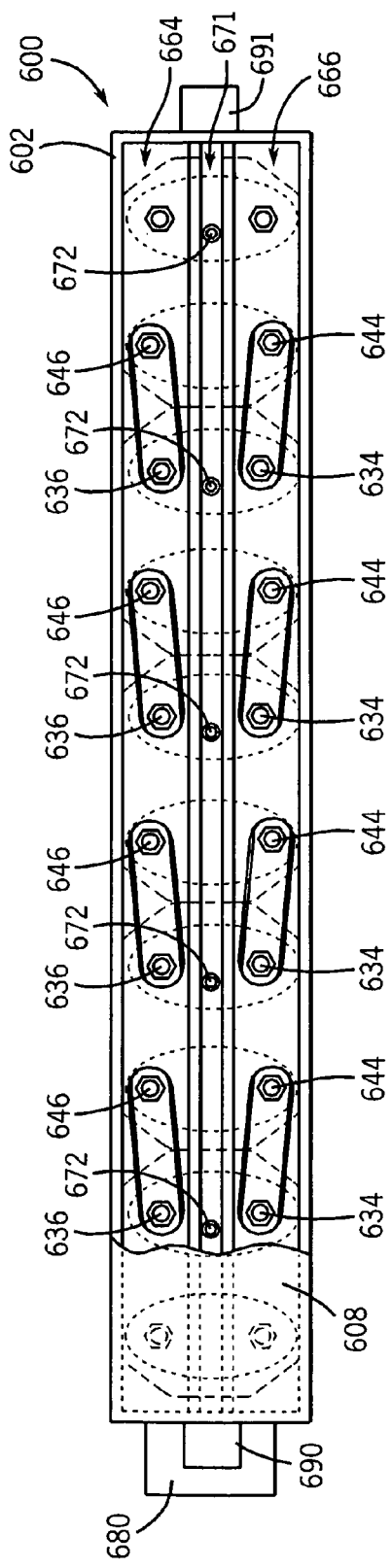
FIG. 19 is a bottom plan view of the battery system shown in FIG. 17.
Figure 20:
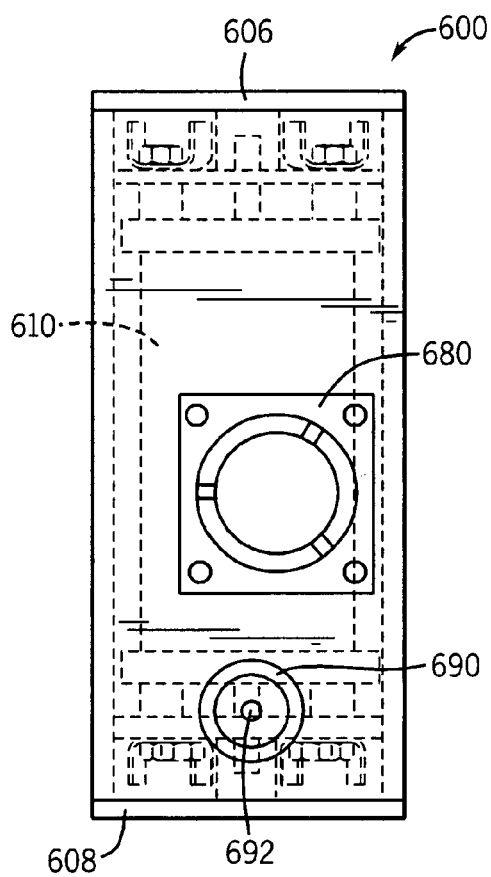
FIG. 20 is a first side view of the battery system shown in FIG. 17.

As shown in FIGS. 17 through 24, adjacent cells 610 are arranged in a manner such that they are inverted relative to each other. That is, negative terminals 634 and 636 of a first battery are provided adjacent positive terminals 644 and 646 of an immediately adjacent battery. In this manner, a positive terminal (e.g., a terminal 644) may be electrically connected or coupled to an adjacent negative terminal (e.g., terminal 634) by a connector 654 (shown in the form of a buss bar). As shown in FIGS. 18 and 19, adjacent cells 610 within module 602 are connected such that all cells 610 within module 602 are connected in series. Thus, moving from left to right in FIGS. 18 and 19, negative terminals of 634 and 636 of a first cell are electrically connected to positive terminals 644 and 646 of a second cell at a top of module 602. To connect the first two cells in series with a third cell adjacent to the second cell, negative terminals 634 and 636 of the second cell are connected to positive terminals 644 and 646 of the third cell at a bottom of module 602. This process is repeated such that connectors 654 alternate between a top of module 602 and a bottom of module 602.

Figure 24:
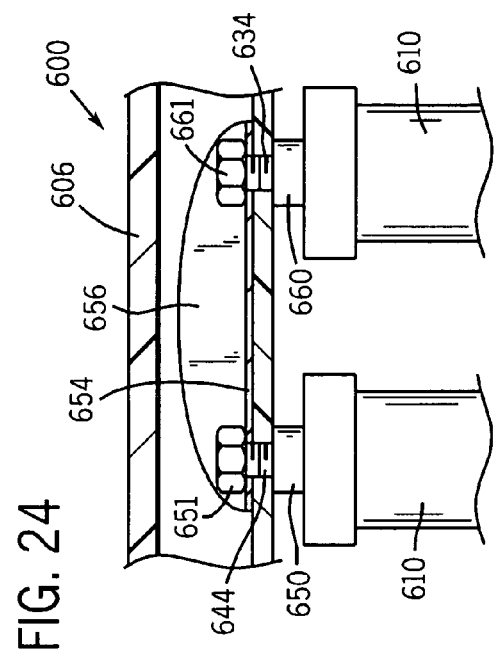
FIG. 24 is a cross-sectional view of a portion of the battery system shown in FIG. 17 taken across line 24-24.

As shown in FIG. 24, connectors 654 include one or more members or elements 656 (shown in the form of fins or extensions) which extend therefrom. Fins 656 may be configured to assist in the conduction of electricity between adjacent cells and/or to help dissipate heat from cells 610 and module 602. Fins 656 may be soldered, welded, or otherwise coupled to connectors 654 and/or to the terminals of the cells. The fins may be configured to have a relatively large surface area which enables greater dissipation of heat from the cells through their terminals.

Figure 23:
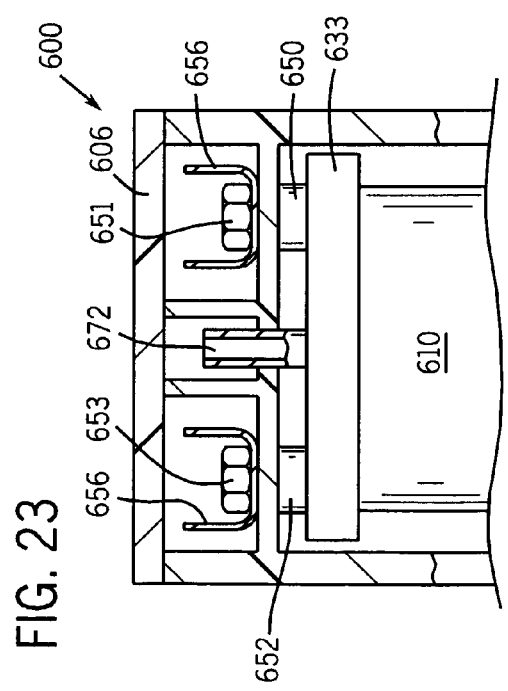
FIG. 23 is a cross-sectional view of a portion of the battery system shown in FIG. 17 taken across line 23-23.

As shown in FIGS. 23 and 24, connectors 654 are coupled to terminals (e.g., terminals 634 and 644 as shown in FIG. 24) using connectors shown in the form of nuts (e.g., nuts 651, 661, and 653). Each of the nuts are threaded onto a threaded terminal (e.g., terminals 634 and 644). Bushings (e.g., shown as bushings 650, 652, and 660) are also provided at the base of the terminals adjacent to cells 610.

Figure 25:
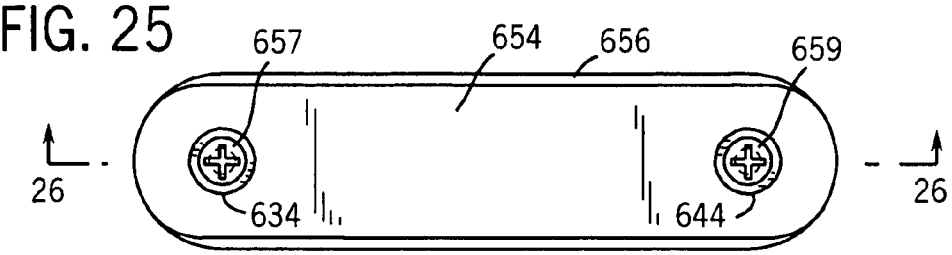
FIGS. 25 through 27 illustrate the attachment of terminals to a connector such as a buss bar according to an exemplary embodiment.
Figure 26:
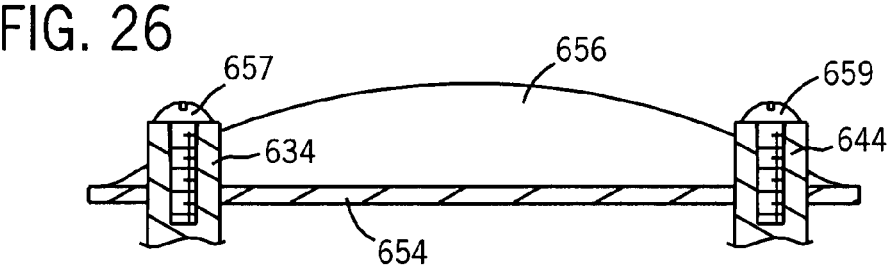
Figure 27:
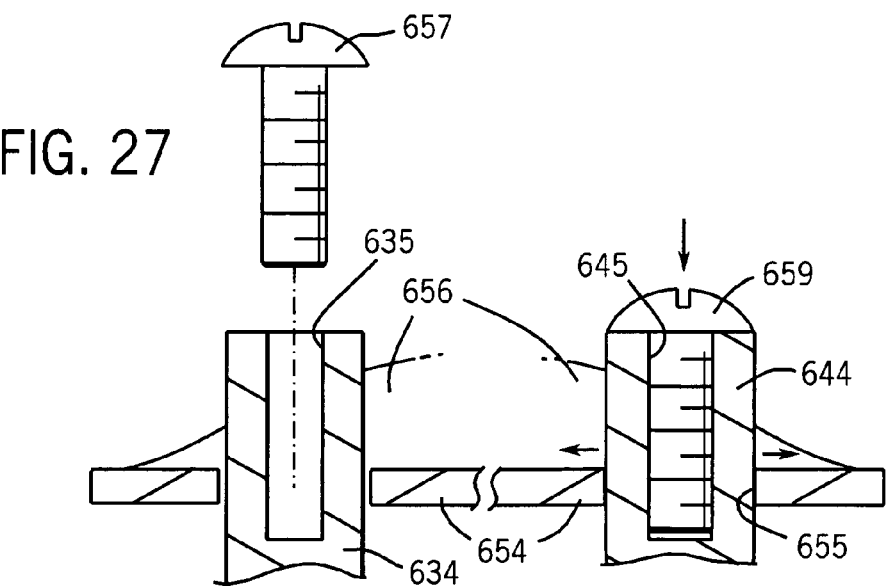

While FIGS. 23 and 24 illustrate a configuration in which connectors 654 are coupled to terminals using a threaded connection, FIGS. 25 through 27 and 28 through 30 illustrate other exemplary embodiments of attaching or coupling a connector to terminals of adjacent batteries. For example, as shown in FIGS. 25 through 27, an opening or aperture 655 is provided in connector 654 that is configured to receive terminals 634 and 646 therethrough. Aperture 655 is configured such that terminals may be received therethrough in a manner such that walls of the aperture allow relatively free passage of the terminals (e.g., the walls of the aperture do not form a tight fit on the terminal). Once connector 654 is provided over the terminal such that the terminal is provided through the aperture, the terminal may be made to expand such that the terminal is relatively tightly engaged by the walls of aperture 655. Terminal 634 includes an aperture 635 (e.g., a pilot hole) and terminal 644 includes an aperture 645. As shown in FIG. 27, a connector or fastener such as a screw is provided within aperture 635 of terminal 634 and a connector such as a screw 659 is provided within aperture 645 of terminal 644. Because apertures 635 and 645 are smaller than the portion of connectors 657 and 659 provided therein, the terminals 634 and 644 expand outward such that the outer walls of the terminals contact aperture 655 provided in connector 654. In this manner, connector 654 may be relatively tightly secured in electrical contact with terminals 634 and 644.

Figure 28:
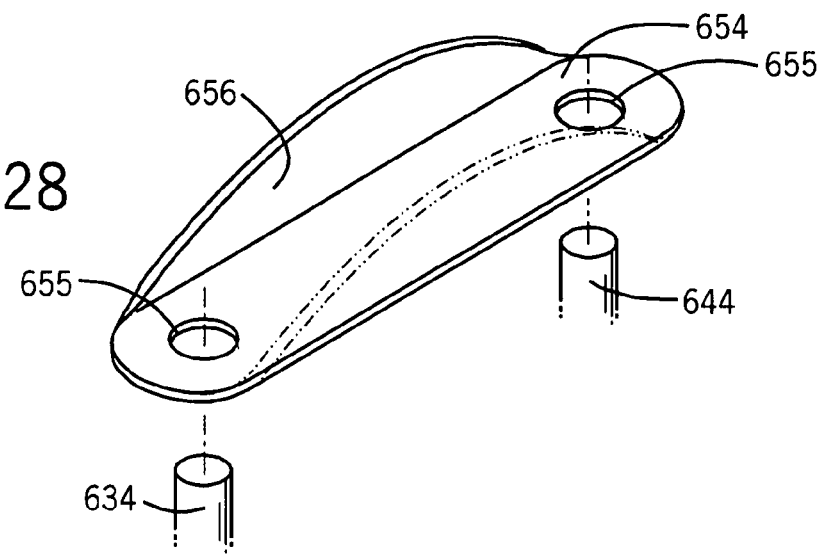
FIGS. 28 through 30 illustrate the attachment of a terminal to a connector such as a buss bar according to another exemplary embodiment.
Figure 29:
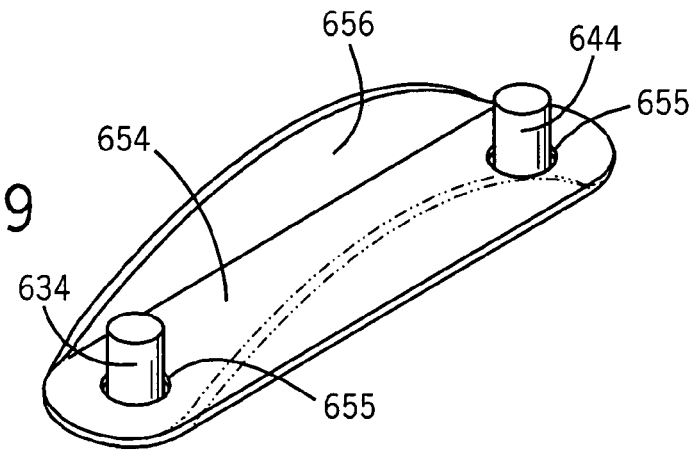
Figure 30:
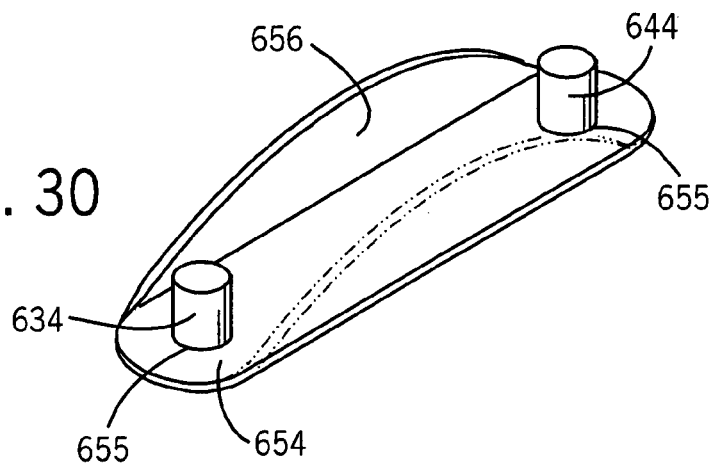
Figure 31:
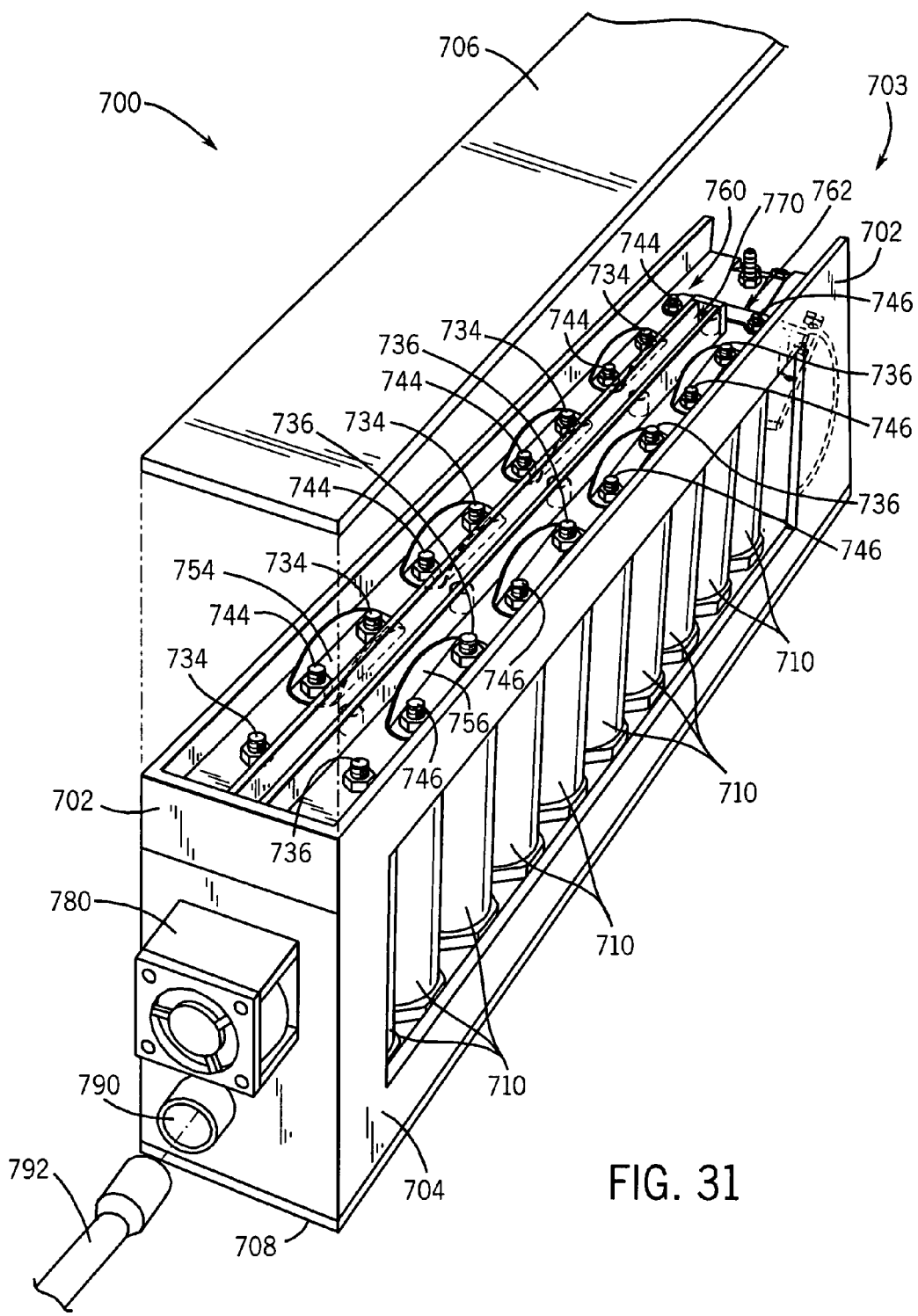
FIG. 31 is a partially exploded perspective view of a battery system according to an exemplary embodiment.
Figure 32:
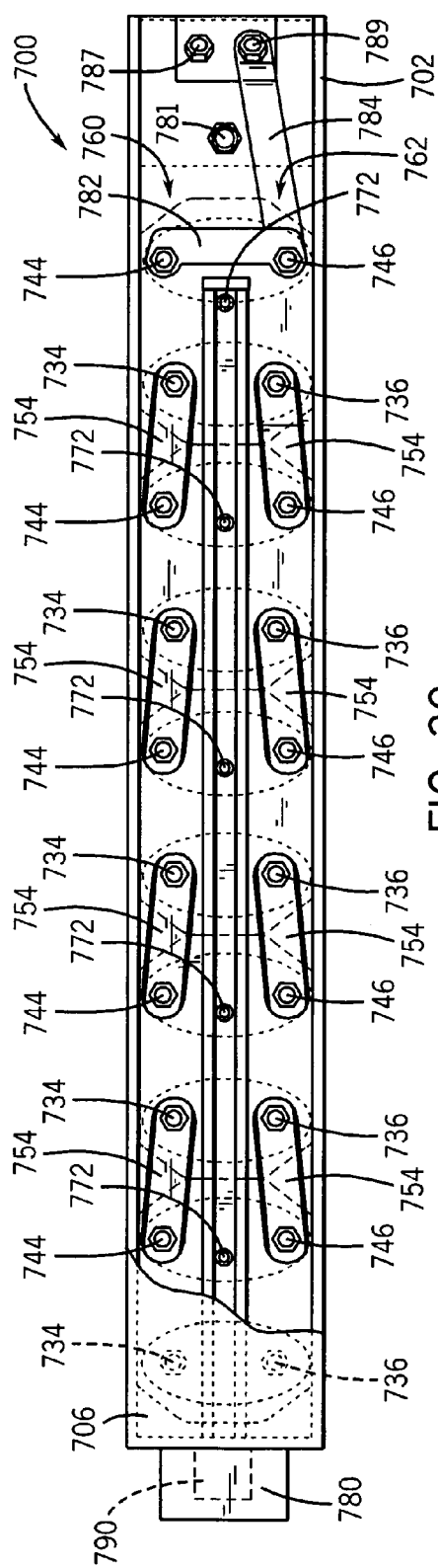
FIG. 32 is a top plan view of the battery system shown in FIG. 31.
Figure 33:
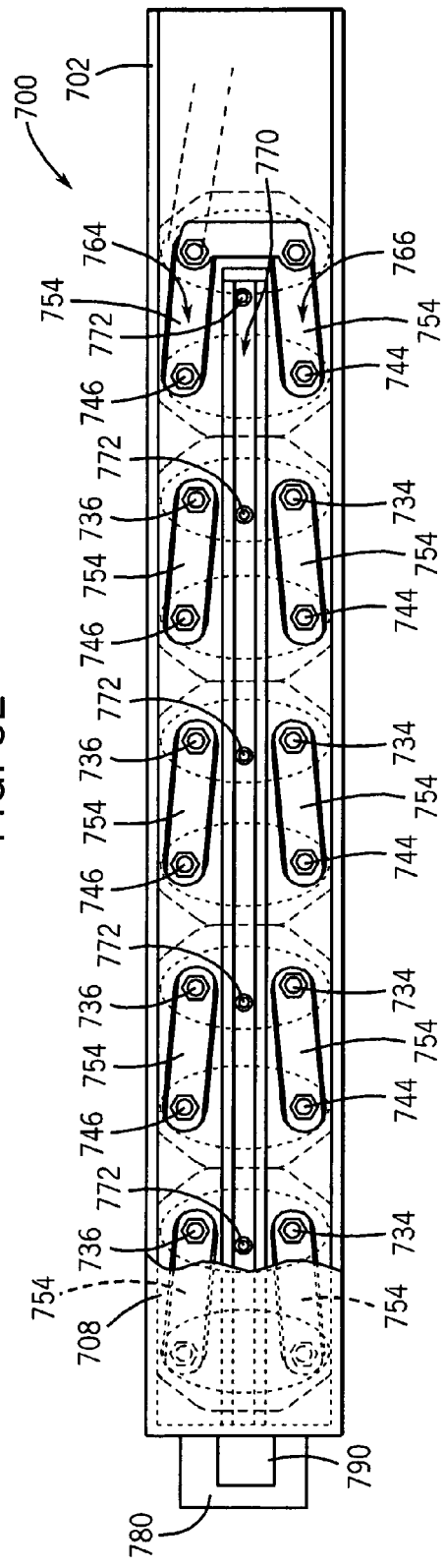
FIG. 33 is a bottom plan view of the battery system shown in FIG. 31.

FIGS. 28 through 30 illustrate another exemplary embodiment of a method for securing connector 654 to terminals 634 and 644. According to this embodiment, connector 654 is made of a material that is designed to expand apertures 655 when the material is cooled or chilled to a particular temperature (e.g., using liquid nitrogen or another method of cooling the connector). Prior to providing connector 654 over terminals 634 and 644, connector 654 is cooled to a temperature sufficient to cause connector 654 and apertures 655 to expand. While connector 654 is in the expanded state, connector 654 may be provided over terminals 634 and 654 such that terminals 634 and 644 are received within apertures 655. As shown in FIG. 29, apertures 655 have a larger diameter than that of terminals 634 and 644 such that terminals 634 and 644 are not tightly engaged by connector 654. As shown in FIG. 30, after allowing connector 654 to return to ambient or room temperature, connector 654 returns to its original state such that aperture 655 contracts around terminals 634 and 644 (e.g., the connector is swaged on the terminals). In this manner, connector 654 may be relatively tightly secured or connected to terminals 634 and 644.

According to an exemplary embodiment shown in FIGS. 17 through 19, module 602 includes a plurality of channels along a top and bottom portion thereof. For example, a top portion of module 602 includes three channels 660, 662, and 670, and a bottom portion of module 602 includes channels 664, 666, and 671.

As shown in FIGS. 17 through 19, module 602 is configured such that terminals (e.g., terminals 634, 636, 644, and 646) are provided within outer channels 660, 662, 664, and 666. Connectors 654 which couple terminals from adjacent cells together are also provided within outer channels 660, 662, 664, and 666. Channels 660, 662, 664, and 666 may be configured to provide a path for fluid to flow across the terminals and connectors included within the channels (e.g., fluid intended for warming of the terminals or cooling of the terminals). For example, a top cover 606 may be coupled to a top surface of module 602 to provide a cover for the various channels, while a bottom cover 608 may be provided on a bottom portion of module 602 to provide a cover for the channels included on the bottom portion of module 602. A gas such as air or another fluid may be passed through channels 660, 662, 664, and 666 to carry heat away from the terminals and connectors included within such channels. A fan 680 or other mechanism may be utilized to force a fluid such as air into the channels or to draw a fluid such as air from the channels to provide a means to move the fluid over or across the terminals and connectors.

As shown in FIGS. 17 through 19 and 22 through 23, channels 670 and 671 may be configured to allow for the removal of gas and/or other materials from within cells 610. For example, a member or element 672 in the form of a tube or hose may extend into vent ports (not shown) provided on both sides of cells 610. Such members 672 extend from cells 610 into channels 671 and 672 to allow gas to travel from within cells 610 into channels 671 and 672. Gas expelled from cells 610 may be withdrawn from module 602 by virtue of fan 680 or another mechanism or device. Center channels 671 and 672 may be configured to collect and direct effluent (such as gases) (and/or other materials) into a side chamber configured for collecting the effluent (such as gases) and/or other materials. The chamber may comprise quenching, retarding, and/or other dissipation material for removing the harmful effects of the collected effluent (such as gases) and/or other materials (e.g., an activated carbon material, an absorptive glass mat material, etc.). The chamber may include any material suitable for this purpose (e.g., a fire retardant material).

Figure 21:
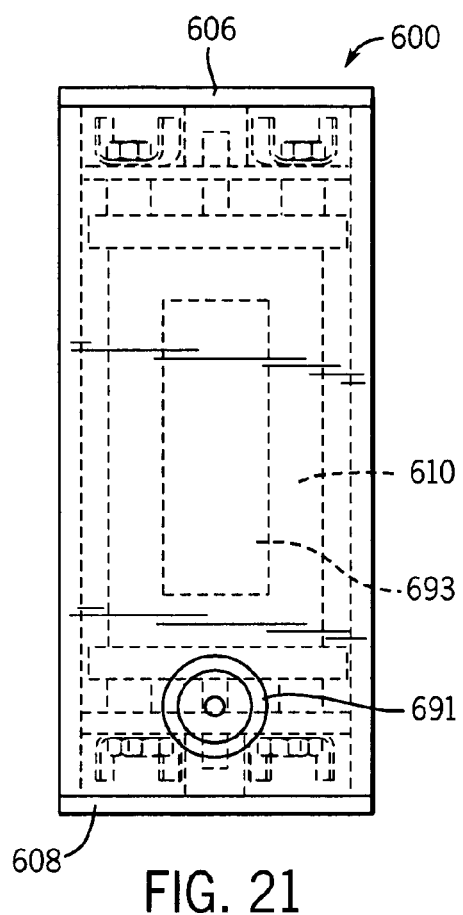
FIG. 21 is a second side view of the battery system shown in FIG. 17.
Figure 22:
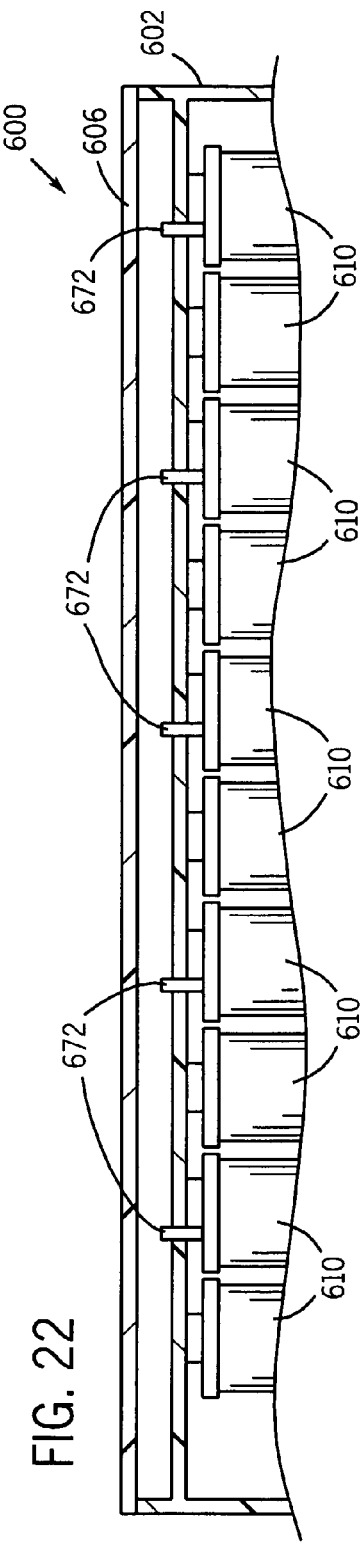
FIG. 22 is a cross-sectional view of a portion of the battery system shown in FIG. 17 taken across line 22-22.

As shown in FIG. 21, an electronic system or device 693 shown schematically (e.g., in the form of a circuit board) is provided at an end of module 602 according to an exemplary embodiment. Any of a variety of electronic devices or systems may be provided within module 602. According to an exemplary embodiment, device 693 is configured to provide functionality for module 602 such as monitoring the voltage and/or temperature of cells 610 provided within module 602, shunting current away from cells 610 and/or module 602 (e.g., when it is determined that a predetermined condition has been satisfied, such as an overvoltage condition in one or more of the cells), communication between module 602 and a vehicle system (e.g., a vehicle electrical system), storage of information relating to module 602 and/or any of a variety of vehicle systems, and/or any other functionality which may be desired according to other exemplary embodiments. While device 693 is shown as being provided at an end of module 602 in FIG. 21, according to other exemplary embodiments, electronic devices may be provided at any suitable location within a module and/or may be provided external to such a module.

As shown in FIGS. 31 through 35, a system 700 is shown according to another exemplary embodiment. Features shown in FIGS. 31 through 35 similar to those shown in FIGS. 17 through 24 are denoted using reference numerals which differ from those used in FIGS. 17 through 24 by 100 (e.g., cells 610 in FIGS. 17 through 24 may be similar to cells 710 shown in FIGS. 31 through 35). Module 702 includes a connector 790 that may be coupled to a wire or cable 792 for connecting module 702 to another module and/or to a vehicle electrical system.

Figure 34:
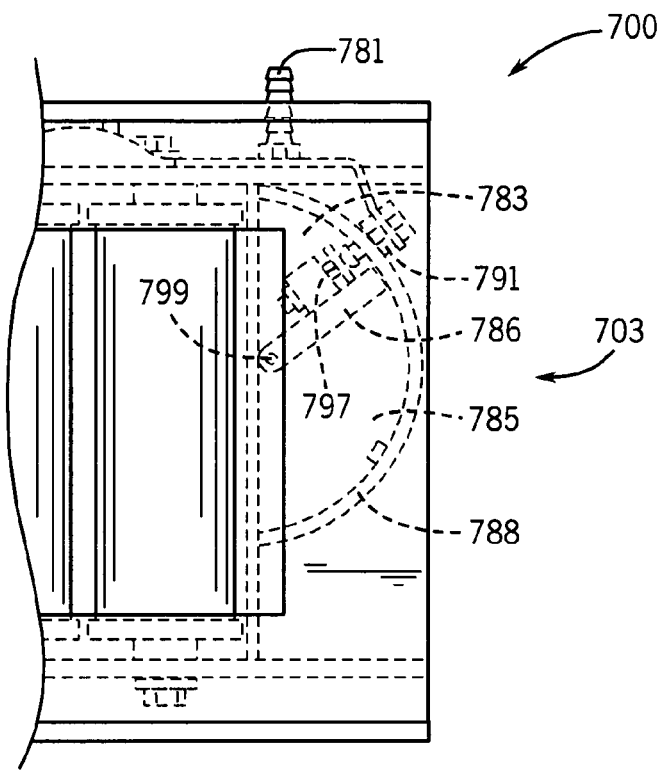
FIG. 34 is a first side view of a portion of the battery system shown in FIG. 31.
Figure 35:
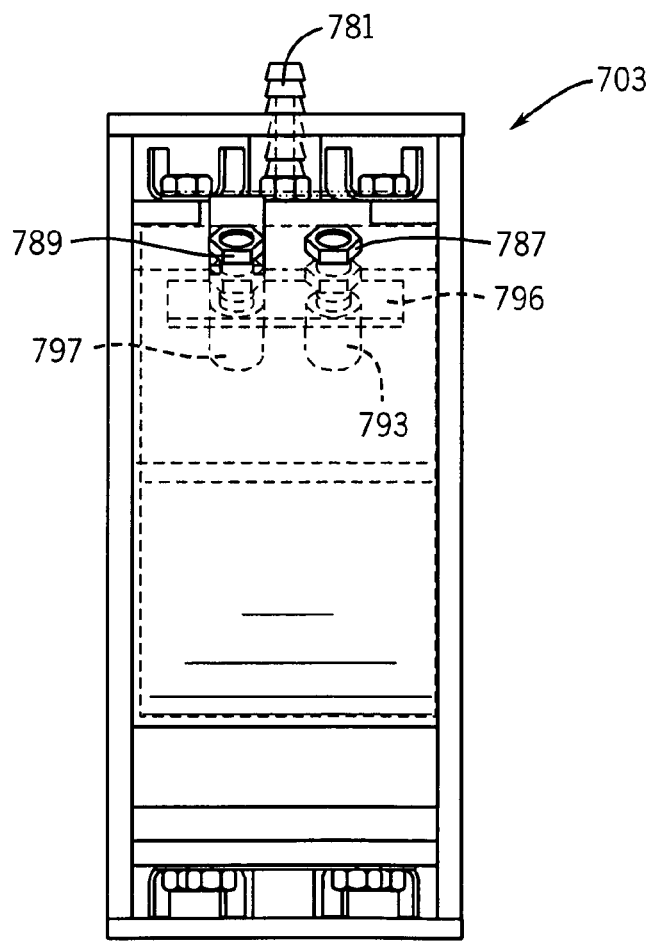
FIG. 35 is a second side view of the battery system shown in FIG. 31.

As shown in FIGS. 34 through 35, module 702 includes a structure 703 in the form of a compartment or chamber at an end thereof that is configured to collect gas expelled from cells 710 (e.g., gas directed from one or both of channels 770 and 771). Structure 703 is also optionally configured to electrically disconnect module 702 from a battery system 700 in the event that an amount of gas expelled from one or more of cells 710 exceeds a predetermined threshold or some other predetermined condition is satisfied (e.g., a temperature of one or more of the cells exceeding a predetermined threshold).

As shown in FIG. 35, structure 703 includes a pair of terminals 787 and 789 that may be utilized to electrically connect module 702 to a battery system and/or features in a vehicle (e.g., a vehicle electrical system). Terminal 787 is connected to terminal 789 by virtue of a member or element 796 that is made of a conductive material (e.g., copper) similar to that used for connectors 754. Terminals 787 and 789 are also electrically coupled to cells 710 by a member 784 which connects terminal 789 to a terminal 746 of an adjacent cell 710, which is in turn electrically connected to a terminal 744 by a member or element 782. Members 782 and 784 may be made of a conductive material such as copper similar to that used for member 796.

As shown in FIG. 34, structure 703 includes a semi-cylindrical chamber that includes a top portion 783 and a bottom portion 785 (see FIG. 34). Top portion 783 is separated from bottom portion 785 by a member or element 786 which abuts a wall 788 of the chamber at a first end and includes a pivot point 799 (e.g., a hinge such as a living hinge or mechanical hinge) at a second end thereof. At least a portion of member 786 (e.g., the portion of member 786 provided in contact with wall 788) may be made of an elastomeric material such as a rubber material.

As shown in FIG. 35, a pair of contacts 793 and 797 are provided on member 786 such that they are normally in contact with terminals 787 and 789 at an interior of structure 703 (terminals 787 and 789 extend through wall 788. In the event that one or more cells 710 included in module 702 expel an amount of gas which exceeds a predetermined threshold, gas directed through channel 770 into top portion 783 of the chamber causes member 786 to rotate about pivot point 799 due to a buildup of pressure in top portion 783 relative to that of bottom portion 785. An outlet (not shown) may be provided such that the pressure in bottom portion 785 is in equilibrium with the pressure outside of structure 703. Movement of member 786, may cause contacts 793 and 797 to become unaligned with terminals 787 and 789 (e.g., contacts 793 and 797 become electrically disconnected from terminals 787 and 789). In such a case, an electrical connection between contact 793 and 797 and terminals 787 and 789 is broken (e.g., a relay may be opened to disconnect power from the module), which may provide a signal to disconnect module 702 from battery system 700 (e.g., using a relay or switch, or another suitable device). According to another exemplary embodiment, disconnection between the terminals and contacts may automatically disconnect the module from the battery system without the requirement for electronics or other means.

As shown in FIG. 34, a valve 781 may also be provided to remove gas from top portion 783 such that member 786 may be moved to re-align contacts 793 and 797 with terminals 787 and 789 once module 702 has been repaired (e.g., by replacing a defective or damaged cell 710).

While FIGS. 31 through 35 illustrate a configuration in which gas entering top portion 783 of the chamber causes movement of member 786 downward as shown in FIG. 34, according to another exemplary embodiment, a module may be configured such that gas from cells included in the module may enter bottom chamber 785, which may cause member 786 to move upward as shown in FIG. 34. Further, while contacts 793 and 797 are shown as being mounted on a top surface of member 786, their position may be reversed such that they are mounted or provided on a bottom surface of member 786 according to another exemplary embodiment (and the system may be configured such that gas enters either the top portion or the bottom portion to move member 786 to disconnect the module from a battery system.

Figure 36:
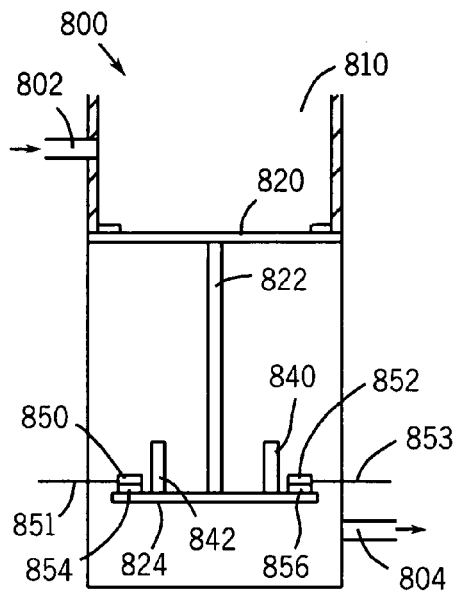
FIG. 36 is a schematic view of a system for collecting gases and disconnecting a battery module according to an exemplary embodiment.

Various other arrangements may be utilized to disconnect a module from a battery system or vehicle electrical system when a predetermined condition is satisfied. For example, FIG. 36 shows a system 800 configured to be provided at an end of a module for disconnecting a module from a battery system when an amount of gas expelled from one or more of the cells of the module exceeds a predetermined threshold. System 800 includes a port or inlet 802 which directs gas from the module (e.g., such as may be directed through channels such as channels 670 and 671 shown in FIGS. 18 through 19) and a port out outlet 804 for allowing gas included in a lower portion of system 800 to be expelled.

As shown in FIG. 36, effluent or gas entering a top portion 810 of system 800 through inlet 802 causes a member or element in the form of a vane (shown as including portions 820, 822, and 824) to move downward (which results in gas in a lower portion of system 800 to be expelled through outlet 804). Portion 824 includes a first contact 854 and a second contact 856 provided thereon, and is made of a conductive material such as a metal. In normal use, contact 854 is provided in contact with a contact 850 which is operably coupled to a member or element 851 in the form of a wire or other electrical conductor, and contact 856 is provided in contact with a contact 852 operably connected to a member or element 853 in the form of a wire or conductor (thus providing a current path that travels through member 851, contacts 850 and 854, portion 824, contacts 856 and 852, and member 853). A spring or detent (not shown) may be utilized to normally maintain contact 854 in contact with contact 850 and contact 856 in contact with a contact 852 (such a spring or detent may be provided as a "one time use" product such that the contacts would not spring back into contact once pressure is relieved). A pair of magnets 840 and 842 may also be provided to manage any arcing which may occur upon disconnection of the contacts.

When member 824 is forced downward as a result of increased gas pressure in top portion 810, contact 851 separates from contact 854, and contact 852 separates from contact 856. As a result, the electrical connection between members 851 and 853 is broken, thus disconnecting the module from the battery system. According to another exemplary embodiment, the system may be arranged so contacts are normally separated and bringing the contacts into contact may act to complete a circuit that removes the module from the battery system.

Figure 37:
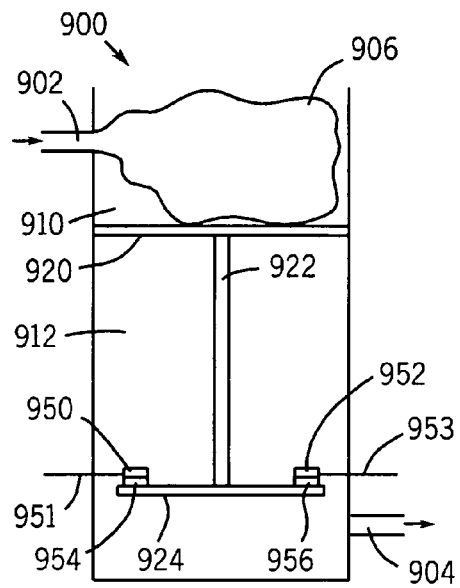
FIG. 37 is a schematic view of a system for collecting gases and disconnecting a battery module according to an exemplary embodiment.

FIG. 37 illustrates a system 900 similar to system 900 shown in FIG. 36. System 900 includes an inlet 902 and an outlet 904 and an airbag 906 coupled to inlet 902. Airbag 906 is provided in a top portion 910 of system 900, and may be configured to inflate when gas enters system 900 through inlet 902. Inflation of airbag 906 causes members 920, 922, and 924 to move downward in lower portion 912 of system 900. A spring or detent (not shown) may be utilized to normally maintain the contacts in an abutting arrangement, which may be overcome due to inflation of airbag 906 (such a spring or detent may be provided as a "one time use" product such that the contacts would not spring back into contact once pressure is relieved). When members 920, 922, and 924 move downward, contact 950 is separated from contact 954 and contact 952 is separated from contact 956, which causes members 951 and 953 (e.g., wires or conductors) to become electrically disconnected from each other, thus electrically disconnecting the module from the battery system. According to another exemplary embodiment, the system may be arranged so contacts are normally separated and bringing the contacts into contact may act to complete a circuit that removes the module from the battery system.

Figure 38:
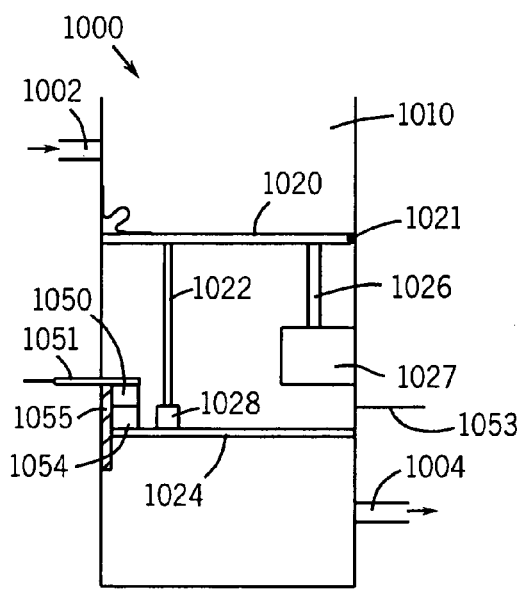
FIG. 38 is a schematic view of a system for collecting gases and disconnecting a battery module according to an exemplary embodiment.

FIG. 38 illustrates a system 1000 according to another exemplary embodiment which includes an inlet 1002 and an outlet 1004. Gas entering a top portion 1010 through inlet 1002 causes member 1020 to pivot about a point 1021. Member 1026 provided above a member 1027 will move to the right as shown in FIG. 38, and rotation of member 1020 will cause downward movement of members 1022, 1024, and 1028 (which in turn may cause disconnection of contacts 1050 and 1054. A magnet 1055 is provided to control arcing that may occur due to separation of contacts 1050 and 1054. Disconnection between contacts 1050 and 1054 will disconnect an electrical connection between a wire 1051 (e.g., a wire for providing power to the module) and a wire 1053 (e.g., a wire for providing power from the module).

Figure 39:
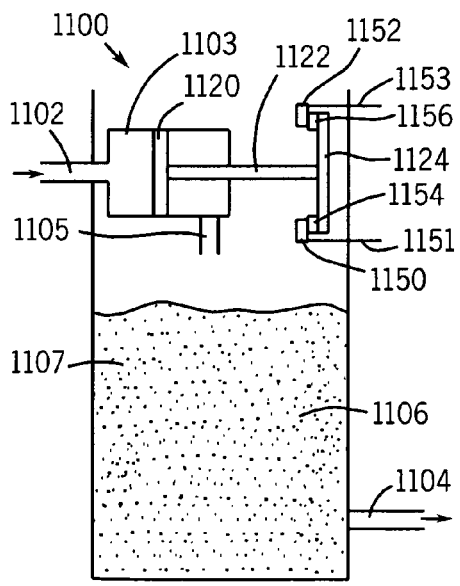
FIG. 39 is a schematic view of a system for collecting effluent (such as gases) and disconnecting a battery module according to an exemplary embodiment.

FIG. 39 illustrates a system 1100 according to another exemplary embodiment. System 1100 includes an inlet 1102 and an outlet 1104. A plunger 1120 is provided within a chamber 1103 operably connected to inlet 1102 such that gas entering chamber 1103 forces plunger 1120 to the right as shown in FIG. 39. Movement of plunger 1120 causes members 1122 and 1124 to move to the right, which causes separation of contact 1152 from contact 1156 and separation of contact 1150 from contact 1154 when a pressure within chamber 1103 reaches a predetermined threshold. According to another exemplary embodiment, the system may be arranged so contacts are normally separated and bringing the contacts into contact may act to complete a circuit that removes the module from the battery system.

Chamber 1103 also includes an outlet 1105 which allows liquid or vapor entering chamber 1103 through inlet 1102 to be removed from chamber 1103 and provided within a chamber 1106 included in system 1100. Chamber 1106 includes a material 1107 such as activated carbon or another material configured to capture and/or neutralize liquid or vapor entering chamber 1106.

Figure 41:
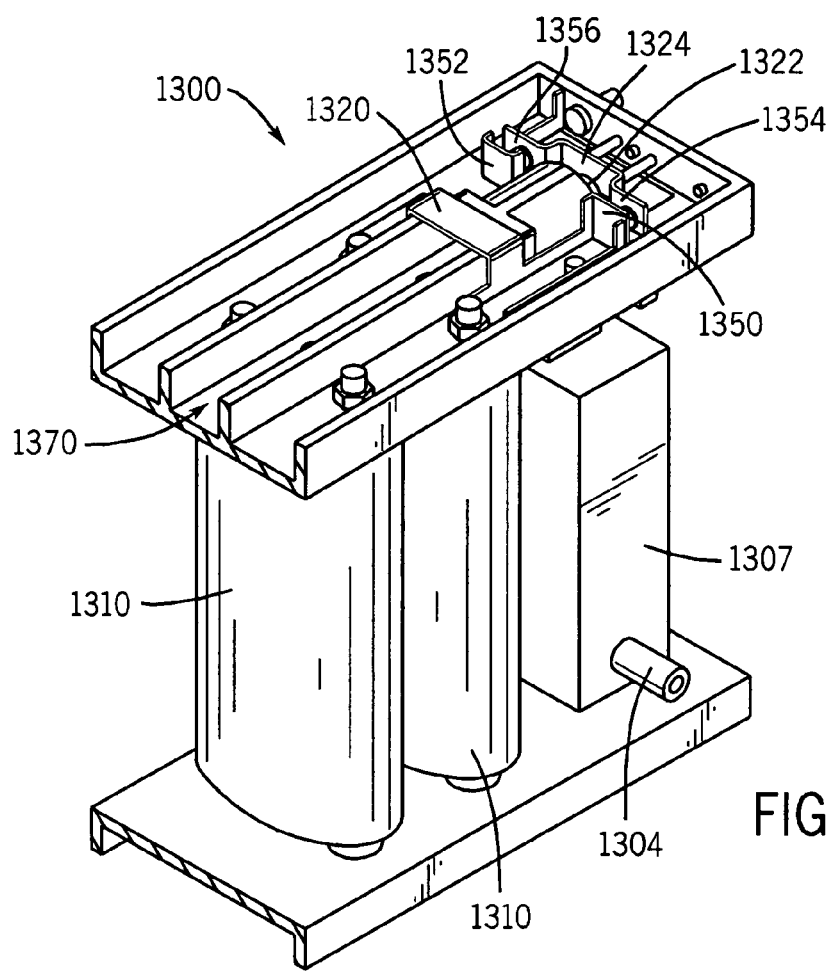
FIG. 41 is a schematic view of a system for collecting effluent (such as gases) and disconnecting a battery module according to an exemplary embodiment.

As shown in FIG. 41, a schematic view of a portion of a module similar to that shown above in FIG. 31 illustrates the use of a system 1300 for collecting gases and disconnecting the module according to an exemplary embodiment. Terminals of various cells 1310 are connected by a connector such as a buss bar 1320. Gas directed through a path or passage such as a channel 1370 causes movement of a member or element 1322 in the form of a plunger. Movement of plunger 1322 due to increased gas pressure within channel 1370 causes movement of a member 1324, which acts to disconnect a contact 1356 from a contact 1352 and to disconnect a contact 1354 from a contact 1350. A chamber or other structure 1307 having an outlet 1304 is provided to capture materials carried in the gas (e.g., liquid, etc.), and may include a material (e.g., an activated carbon material, an absorptive glass mat material, etc.) for capturing and/or neutralizing such material.

According to an exemplary embodiment, a module (e.g., modules 602 and/or 702) may comprise an end housing that includes charging electronics, cooling, communication and venting safety devices for the system. For example, the battery system may include a system for monitoring and regulating voltage under certain circumstances.

According to an exemplary embodiment, the battery module may comprise temperature sense terminals where the temperature and/or voltage may be tested by a sensor. For example, a temperature sensor may be attached to any of the terminals to determine the temperature.

Figure 40:
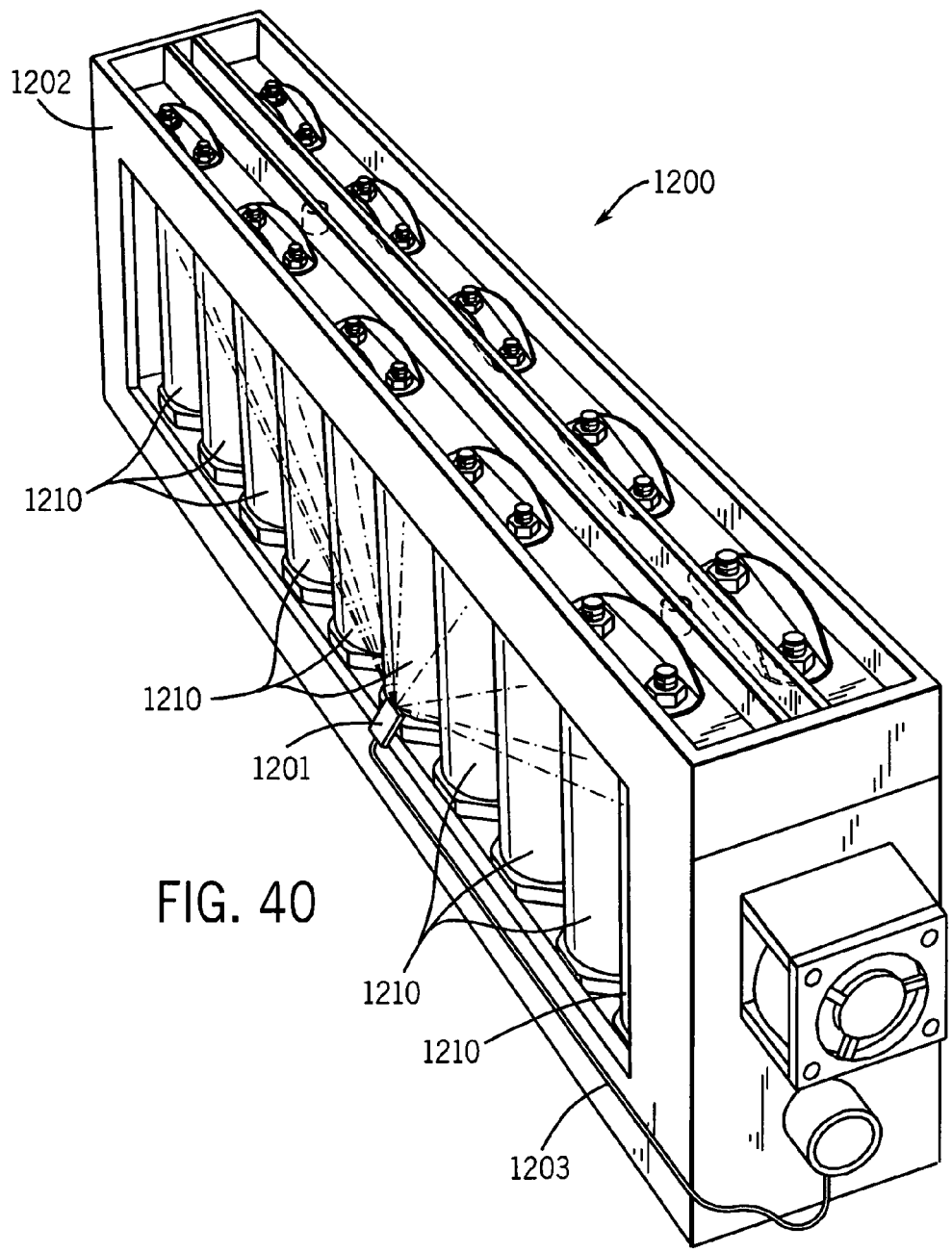
FIG. 40 is a perspective view of a battery system having a temperature sensing device according to an exemplary embodiment.

According to other exemplary embodiments, other types of temperature sensors may be utilized. For example, FIG. 40 illustrates a system 1200 that includes a module 1202 having a number of cells 1210. A sensor 1201 in the form of an infrared array laser is provided to monitor temperatures of individual cells 1210 (e.g., to transmit temperature data to a monitoring system or other device for updating a thermal management system for module 1202). According to an exemplary embodiment, sensor 1201 is provided as a single head infrared or laser thermometer having a rotation of approximately 1.0 RPMs as 180 deg C. or F. or 368 deg C. or F. capability. One advantageous feature of such a device is that temperature measurements for the various cells 1210 may be obtained without having to utilize an individual sensor for each cell (e.g., a sensor provided in contact with each of cells 510). Such a device may also be configured to measure temperature at various locations on the surface of cells 1210. Sensor 1201 may be provided as a stationary or a rotating type of laser thermometer, and may also be connected by a connector 1203 such as a wire or other conductor to electronics or other devices included within system 1200. Sensor 1201 may advantageously allow the accumulation of a relatively large number of measurements in a relatively short period of time, and may be configured to measure relatively high temperatures (e.g., greater than 1200 deg C.).

According to various other exemplary embodiments, other temperature sensors may be utilized, including thermocouples, resistance temperature detectors, thermisters, and the like.

It is intended that various advantageous features may be obtained utilizing the configuration and arrangements of a battery system having one or more module and cells as shown and described in this application. According to particularly preferred embodiments, for example, lithium cells may be utilized that have an improved cell construction for enhanced heat transfer (e.g., with a shape and/or configuration intended to provide greater heat flow by conduction and/or convection or by materials for the case and terminals inteded to provide enhanced heat flow and/or dissipation). Such cells may include dual terminal axial leads to provide a greater ability for cooling of the cells and a reduced internal resistance for the cells, as well as heat conducting terminal bushings provided in contact with the terminals. Such cells may comprise terminal sets comprising a plurality of terminals having a uniform configuration or varying configurations intended to promote heat transfer as well as suitable electrical connectivity.

According to any preferred embodiment, the lithium-ion battery system is intended to have an improved modular construction that allows for relative ease of manufacture, assembly, servicing and/or replacement of all or part (or components) of the system. Arrangements for providing modular or relatively simple interconnections for electrical connectivity, heat transfer paths and effluent venting may be integrated into the system. For example, a venting features such as a vent channel to collect effluent gas and/or material expelled from the vent ports, a vent chamber for collecting gas or other materials and having materials to quench, retard, and/or dissipate harmful materials and/or gases, etc. may be included through interconnection of cells in the battery system.

Electronic components and circuits may be provided and/or used in conjunction with the battery system. For example, a voltage control system (or circuit) may be utilized to monitor and/or control the voltage of a module and/or individual cells. Temperature sensors such as temperature sense terminal connectors or other temperature monitoring devices may be utilized to monitor and/or allow the control of battery temperature. Heat transfer across cells may be provided at one or both of the top and/or the bottom of a cell, for example, by creation of one or more heat transfer paths (e.g. coolant/heating fluid flow channels) within the module at both the top and bottom of the module. Cell balancing technology may be integrated within the control system/electronics to optimize performance, among other things.

The system may also be configured to operated conjunction with a battery management system, for example, to predict the performance of modules and/or individual cells will perform in certain applications as expected in the future. According to various alternative embodiments, any suitable battery management system may be used in conjunction with the battery system.

Figure 42:
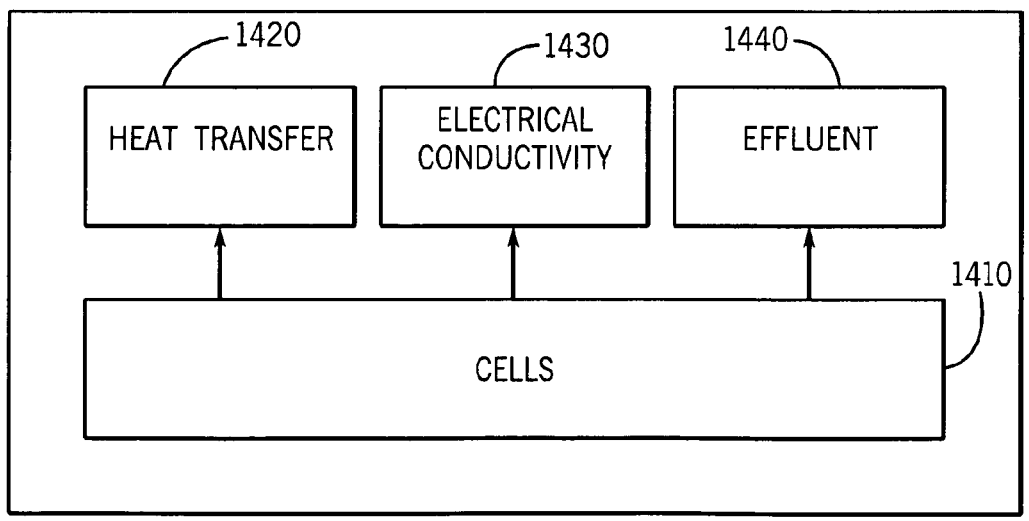
FIG. 42 is a schematic block diagram illustrating features of a battery system according to an exemplary embodiment.

FIG. 42 is a schematic block diagram showing a battery system 1400 that includes a plurality of cells 1410 (e.g., in a module or other structure) according to an exemplary embodiment. Each of cells 1410 is configured to provide for heat transfer across the cells along at least one heat transfer path 1420 (e.g., heat may be transferred at terminals of cells 1410 via a path or passage such as a channel that may have a fluid such as a gas, coolant, heating fluid or other fluid to facilitate heat transfer from terminals and/or other features provided in or coupled to cells 1410). Each of cells 1410 is configured to provide for electrical interconnectivity along at least one electrical conductivity path 1430 (e.g., through interconnected cells and cell terminals). Each of cells 1410 is also configured to provide for the flow or venting of effluent (e.g. gases or other materials) may be expelled from cells 1410 through at least one effluent path or passage (e.g., a channel or other structure configured to facilitate the flow of effluent to a chamber or other location within or outside of the module). Other features may also be included within system 1400 according to various other exemplary embodiments (e.g., electronics for providing various functionality for the system, a chamber or other structure for collecting effluent, systems for disconnecting the module from a vehicle electrical system when a predetermined condition has been satisfied, etc.).

The various modules and systems described and shown herein are intended to be utilized with any of a variety of cell chemistries, including those conventional lithium battery chemistries now known and those that may be developed in the future. It should be noted that the use of the term lithium battery in this application (including the claims) is intended to include all types of lithium battery chemistries, including lithium-ion battery chemistries, lithium-polymer battery chemistries, and the like.

It is important to note that the construction and arrangement of the battery system, modules, and cells as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements (e.g., terminals and straps may be integrally formed or may be produced separately and welded or otherwise connected together), the position of elements may be reversed or otherwise varied (e.g., the orientation of the various cells may be reversed), and the nature or number of discrete elements or positions may be altered or varied (e.g., any number of cells may be included in a module). Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the preferred and other exemplary embodiments without departing from the scope of the present inventions as expressed in the appended claims.

What is claimed is:

1. A battery system comprising:
a plurality of electrically connected lithium batteries, wherein each lithium battery includes a first positive terminal and a second positive terminal extending from a first end thereof and a first negative terminal and a second negative terminal extending from a second end thereof, wherein the first positive terminal and the second positive terminal of each lithium battery are separated by a first distance and the first negative terminal and the second negative terminal of each lithium battery are separated by a second distance, the first distance differing from the second distance to assure correct orientation of each lithium battery.

2. The battery system of claim 1 wherein the lithium batteries comprise lithium cells.

3. The battery system of claim 2 wherein the plurality of electrically connected lithium batteries are provided within a module, the module being configured according to the first distance and the second distance to assure correct orientation of the plurality of lithium batteries within the module.

4. The battery system of claim 1 wherein the plurality of lithium batteries are provided such that the positive terminals of each of the batteries are adjacent the negative terminals of an adjacent battery.

5. The battery system of claim 1 further comprising a connector for electrically connecting at least one negative terminal of a first of the plurality of lithium batteries to at least one positive terminal of a second of the plurality of lithium batteries.

6. The battery system of claim 5 wherein the connector comprises an element configured to assist in removing heat from the at least one negative terminal of the first of the plurality of lithium batteries and the at least one positive terminal of the second of the plurality of lithium batteries.

7. The battery system of claim 6 wherein the element configured to assist in removing heat comprises a fin.

8. The battery system of claim 5 wherein the connector includes a plurality of apertures, each of the apertures configured to receive a terminal of a battery therethrough.

9. The battery system of claim 8 wherein the connector comprises a material configured to allow the apertures to expand when the connector is cooled.

10. The battery system of claim 8 wherein the connector is secured to the at least one negative terminal of the first of the plurality of lithium batteries and the at least one positive terminal of the second of the plurality of lithium batteries by engagement between the terminals and walls of the plurality of apertures.

11. The battery system of claim 10 wherein the at least one negative terminal of the first of the plurality of lithium batteries and the at least one positive terminal of the second of the plurality of lithium batteries to which the connector is secured each have a fastener provided therein to expand the terminals.

12. The battery system of claim 5 wherein the at least one negative terminal of the first of the plurality of lithium batteries and the at least one positive terminal of the second of the plurality of lithium batteries have a threaded surface and are coupled to the connector using a threaded fastener.

13. The battery system of claim 1 wherein each lithium battery includes a container comprising a conductive material.

14. The battery system of claim 13 wherein the container has a generally oval shape.

15. The battery system of claim 1 wherein the battery system further comprises at least one channel provided at a top portion of the battery system for directing a fluid past a first group of the battery terminals and at least one channel provided at a bottom portion of the battery system for directing a fluid past a second group of different battery terminals.

16. The battery system of claim 15 wherein the top portion of the battery system includes a first channel for directing a fluid past the first group of the battery terminals and a second channel for directing a fluid past the second group of the battery terminals, the first channel having each of the terminals of the first group provided therein and the second channel having each of the terminals of the second group provided therein, wherein the first group of terminals includes one terminal from each of the lithium batteries, and the second group of terminals includes another terminal from each of the lithium batteries.

17. The battery system of claim 16 further comprising a third channel provided at the top portion of the battery system for directing gases from at least a portion of the plurality of lithium batteries.

18. The battery system of claim 17 wherein the third channel is provided between the first channel and the second channel.

19. The battery system of claim 17 wherein the third channel is aligned with vent ports provided in the at least a portion of the plurality of lithium batteries to allow gas expelled through the vent ports to enter the third channel.

20. The battery system of claim 1 wherein the battery system comprises means for passing a fluid past the terminals of the plurality of lithium batteries.

21. The battery system of claim 20 wherein the means for passing a fluid past the terminals of the plurality of lithium batteries comprises a fan.

22. The battery system of claim 1 wherein the battery system comprises a system for collecting gases expelled from at least one of the plurality of lithium batteries.

23. The battery system of claim 22 wherein the system for collecting gases comprises means for disconnecting the battery system from a vehicle power system.

24. The battery system of claim 22 wherein the system for collecting gases comprises a member configured to move when gas pressure exceeds a predetermined threshold, the member configured to effect disconnection of the battery system when the gas pressure exceeds the predetermined threshold.

25. The battery system of claim 22 wherein the system for collecting gases comprises a material for collecting materials carried in the collected gases.

26. The battery system of claim 25 wherein the material for collecting materials carried in the collected gases comprises a material selected from the group consisting of activated carbon, an absorptive glass mat material, and combinations thereof.

27. The battery system of claim 1 wherein the battery system comprises at least one device for monitoring a temperature of at least one of the plurality of lithium batteries.

28. The battery system of claim 27 wherein the at least one device for monitoring a temperature of at least one of the plurality of lithium batteries comprises at least one of an infrared thermometer and a laser thermometer.

29. A battery system comprising:
a plurality of electrically connected lithium batteries, wherein each lithium battery comprises a container, a first positive terminal and a second positive terminal extending form a first end of the container, and a first negative terminal and a second negative terminal extending from a second end of the container;
wherein the first positive terminal and the second positive terminal are separated by a first distance and the first negative terminal and the second negative terminal are separated by a second distance, the first distance differing from the second distance.

30. The battery system of claim 29 wherein the plurality of electrically connected lithium batteries are provided within a module, the module being configured according to the first distance and the second distance to assure correct orientation of the plurality of lithium batteries within the module.

31. The battery system of claim 30 wherein correct orientation includes the first positive terminal and the second positive terminal of each lithium battery being provided adjacent to the first negative terminal and the second negative terminal, respectively, of an adjacent lithium battery within the module.

32. The battery system of claim 31 wherein the module will not allow improper insertion of each lithium battery within the module.

33. The battery system of claim 29 wherein the first and second positive terminals and the first and second negative terminals each include a threaded portion.

34. The battery system of claim 29 wherein the first positive terminal, the second positive terminal, the first negative terminal, and the second negative terminal are configured to provide for heat transfer from each of the plurality of lithium batteries.

35. The battery system of claim 29 wherein first positive terminal, the second positive terminal, the first negative terminal, and the second negative terminal are configured to provide enhanced current distribution for each of the plurality of lithium batteries as compared to a battery having only a single positive terminal and a single negative terminal.

36. The battery system of claim 29 wherein for each lithium battery, the first positive terminal and the second positive terminal are coupled to the container.

37. The battery system of claim 29 wherein the container has a generally oval shape.

38. The battery system of claim 29 wherein at least one positive electrode, at least one negative electrode, and a separator provided intermediate the at least one positive electrode and the at least one negative electrode are provided within the container.

39. The battery system of claim 38 wherein the at least one positive electrode and the at least one negative electrode are provided within the container such that a first portion of the at least one positive electrode extends beyond a first portion of the at least one negative electrode at a first end of the container and a second portion of the at least one negative electrode extends beyond a second portion of the at least one positive electrode at a second end of the container.

40. The battery system of claim 38 further comprising a member coupled to a portion of the at least one positive electrode and to at least one of the terminals.

41. The battery system of claim 40 wherein the member has a generally crescent shape.

42. The battery system of claim 40 further comprising a material provided in at least a portion of a space between the at least one positive electrode and the at least one negative electrode for preventing unwanted material from entering the space.

43. The battery system of claim 42 wherein the material is an epoxy.

44. The battery system of claim 40 further comprising at least one fin extending between a surface of the member and the at least one terminal for providing at least one of enhanced heat transfer from within each of the plurality of lithium batteries and enhanced conductivity for each of the plurality of lithium batteries.

45. The battery system of claim 29 further comprising a first cap coupled to the container and provided at the first end of each of the plurality of lithium batteries and a second cap coupled to the container and provided at the second end of each of the plurality of lithium batteries.

46. The battery system of claim 45 wherein the first cap and the second cap include at least one vent port for allowing removal of gases from within each of the plurality of lithium batteries.

47. The battery system of claim 45 wherein the first cap and the second cap comprise a polymeric material.

48. The battery system of claim 45 wherein the first cap and the second cap are configured to act as spacers to prevent contact between the containers of adjacent batteries.

49. The battery system of claim 29 wherein the container includes an outer surface, and further comprising a plurality of features extending from the outer surface of the container for providing enhanced heat transfer for the container.

50. The battery system of claim 29 further comprising a mandrel provided in the battery for providing a structure around which at least one positive electrode and at least one negative electrode are wound.

51. A battery system comprising:
a plurality of lithium-ion cells electrically connected in series, wherein each lithium-ion cell includes a first positive terminal and a second positive terminal extending from a first end thereof and a first negative terminal and a second negative terminal extending from a second end thereof, wherein the first positive terminal and the second positive terminal of each lithium-ion cell are separated by a first distance and the first negative terminal and the second negative terminal of each lithium-ion cell are separated by a second distance to assure that the plurality of lithium-ion cells are properly connected.

52. The battery system of claim 51 further comprising a means for directing a fluid past the first and second positive terminals and the first and second negative terminals to remove heat from the plurality of lithium-ion cells.

53. The battery system of claim 52 wherein the means for directing a fluid comprises at least one channel.

54. The battery system of claim 51 further comprising means for directing gas expelled from the plurality of lithium-ion cells.

55. The battery system of claim 54 wherein the means for directing gas expelled from the plurality of lithium-ion cells comprises at least one channel aligned with vent ports provided in the plurality of the lithium-ion cells.

56. The battery system of claim 54 further comprising a system for collecting gas expelled from the plurality of lithium-ion cells.

57. The battery system of claim 51 wherein the plurality of electrically connected lithium-ion cells are provided within a module, the module being configured according to the first distance and the second distance to assure correct orientation of the plurality of lithium-ion cells within the module.

58. The battery system of claim 51 further comprising a connector for electrically connecting a negative terminal of a first of the plurality of lithium-ion cells to a positive terminal of a second of the plurality of lithium-ion cells.

59. The battery system of claim 51 wherein each lithium-ion cell includes a container comprising a material that is configured to conduct heat.

60. A battery system comprising:
a plurality of electrically connected cells, wherein each electrically connected cell comprises a container, a first terminal set having a first terminal and a second terminal, and a second terminal set having a third terminal and a fourth terminal, wherein the first terminal set is provided on a first end of the container and the second terminal set is provided on a second end of the container, wherein the first terminal set and second terminal set of each electrically connected cell are configured different from one another, such that the distance between the first and second terminals is different than the distance between the third and fourth terminals to assure that the plurality of electrically connected cells are properly connected.

61. The battery system of claim 60 further comprising a first path for heat transfer across the first terminal set of each of the plurality of cells and a path configured to direct a flow of effluent from at least one of the plurality of cells.

62. The battery system of claim 61 wherein the first path for heat transfer is defined by a plurality of channels.

63. The battery system of claim 62 wherein each of the plurality of channels are configured to allow a fluid to be passed across at least one terminal included in the first terminal set of each of the plurality of cells.

64. The battery system of claim 63 wherein each cell is connected to at least one adjacent cell by a connector, at least a portion of the connector provided within one of the plurality of channels.

65. The battery system of claim 61 wherein the first path for heat transfer across the first terminal set of each of the plurality of cells is located at a top portion of the battery system.

66. The battery system of claim 64 further comprising a second path for heat transfer across the second terminal set of each of the plurality of cells.

67. The battery system of claim 65 wherein the second path for heat transfer across the second terminal set of each of the plurality of cells is located at a lower portion of the battery system.

68. The battery system of claim 61 wherein each cell comprises a vent.

69. The battery system of claim 68 wherein each of the vents is in communication with the path configured to direct the flow of effluent.

70. The battery system of claim 60 wherein each cell has a rounded elongate cross-section.

71. The battery system of claim 60 wherein the first terminal and second terminal have the same polarity.

72. The battery system of claim 71 wherein the third terminal and the fourth terminal have the same polarity.

73. The battery system of claim 60 wherein the plurality of cells are electrically connected along a first path for electrical connectivity across a top portion of the battery system and along a second path for electrical connectivity across a bottom portion of the battery system.

74. The battery system of claim 73 wherein the first path for electrical connectivity and the second path for electrical connectivity are connected through the plurality of cells.

75. The battery system of claim 61 wherein the path configured to direct the flow of effluent comprises a channel.

76. The battery system of claim 60 wherein the battery system further comprises a circuit configured to monitor electrical performance.

77. The battery system of claim 76 wherein the circuit is configured to monitor a temperature of the module.

78. The battery system of claim 76 wherein the circuit is configured to provide an output signal.

79. The battery system of claim 76 wherein the circuit is configured to monitor a condition of at least one cell.

* * * * *